(12) United States Patent
Solomon et al.

(10) Patent No.: US 12,464,939 B2
(45) Date of Patent: Nov. 4, 2025

(54) ARTICLES INCLUDING NANOSTRUCTURED SURFACES AND ENCLOSED VOIDS, METHODS OF MAKING SAME, AND OPTICAL ELEMENTS

(71) Applicant: 3M INNOVATIVE PROPERTIES COMPANY, St. Paul, MN (US)

(72) Inventors: Jeffrey L. Solomon, Centerville, MN (US); Christopher S. Lyons, St. Paul, MN (US); Joseph C. Spagnola, Woodbury, MN (US); Thomas P. Klun, Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 135 days.

(21) Appl. No.: 18/016,390

(22) PCT Filed: Jul. 28, 2021

(86) PCT No.: PCT/IB2021/056879
§ 371 (c)(1),
(2) Date: Jan. 16, 2023

(87) PCT Pub. No.: WO2022/043787
PCT Pub. Date: Mar. 3, 2022

(65) Prior Publication Data
US 2023/0271401 A1 Aug. 31, 2023

Related U.S. Application Data

(60) Provisional application No. 63/117,079, filed on Nov. 23, 2020, provisional application No. 63/071,488, filed on Aug. 28, 2020.

(51) Int. Cl.
*H10K 71/50* (2023.01)
*B32B 3/30* (2006.01)
(Continued)

(52) U.S. Cl.
CPC .............. *H10K 71/50* (2023.02); *B32B 3/30* (2013.01); *B32B 7/12* (2013.01); *B32B 9/005* (2013.01);
(Continued)

(58) Field of Classification Search
CPC .. B32B 3/30; B32B 7/12; B32B 9/005; B32B 9/045; B32B 15/09; B32B 15/20;
(Continued)

(56) References Cited

U.S. PATENT DOCUMENTS 6,005,137 A 12/1999 Moore et al.
6,329,058 B1 12/2001 Arney et al.
(Continued)

FOREIGN PATENT DOCUMENTS

JP 2017097334 A * 6/2017
WO 2009002637 A2 12/2008
(Continued)

OTHER PUBLICATIONS

JP 2017-097334A, English Translation from JPlatPat (Year: 2017).*
(Continued)

*Primary Examiner* — Alicia J Weydemeyer
*Assistant Examiner* — Laura B Figg
(74) *Attorney, Agent, or Firm* — Adrian L. Pishko; Sriram Srinivasan

(57) ABSTRACT

The present disclosure provides an article including a layer having a nanostructured first surface including nanofeatures and an opposing second surface, and an inorganic layer including a major surface bonded to a portion of the nanostructured first surface. The nanostructured first surface includes protruding features that are formed of a single composition and/or recessed features. The article includes at least one enclosed void defined in part by the nanostructured first surface. The present disclosure also provides a method
(Continued)

of making the article including treating a major surface of an inorganic layer with a coupling agent, contacting a nanostructured surface of a layer with the treated inorganic layer, and securing the two layers together via a bonded coupling agent by bonding at least one of the nanostructured surface or the treated inorganic layer. In addition, the present disclosure provides an optical element including the article. The nanostructured surface of the article is protected from damage and contamination by the inorganic layer.

13 Claims, 6 Drawing Sheets

(51) Int. Cl.
| | |
|---|---|
| B32B 7/12 | (2006.01) |
| B32B 9/00 | (2006.01) |
| B32B 9/04 | (2006.01) |
| B32B 15/09 | (2006.01) |
| B32B 15/20 | (2006.01) |
| B32B 17/10 | (2006.01) |
| B32B 27/08 | (2006.01) |
| B32B 27/30 | (2006.01) |
| B32B 27/32 | (2006.01) |
| B32B 27/36 | (2006.01) |
| B32B 27/40 | (2006.01) |
| B32B 37/12 | (2006.01) |
| B32B 37/24 | (2006.01) |
| B32B 38/00 | (2006.01) |
| B32B 38/06 | (2006.01) |
| B82B 1/00 | (2006.01) |
| G02B 5/18 | (2006.01) |

(52) U.S. Cl.
CPC .............. *B32B 9/045* (2013.01); *B32B 15/09* (2013.01); *B32B 15/20* (2013.01); *B32B 17/10* (2013.01); *B32B 27/08* (2013.01); *B32B 27/308* (2013.01); *B32B 27/32* (2013.01); *B32B 27/36* (2013.01); *B32B 27/40* (2013.01); *B32B 37/12* (2013.01); *B32B 37/24* (2013.01); *B32B 38/0008* (2013.01); *B32B 38/06* (2013.01); *B32B 2037/243* (2013.01); *B32B 2255/10* (2013.01); *B32B 2255/20* (2013.01); *B32B 2270/00* (2013.01); *B32B 2305/74* (2013.01); *B32B 2307/7376* (2023.05); *B32B 2310/0831* (2013.01); *B32B 2311/24* (2013.01); *B32B 2315/08* (2013.01); *B32B 2323/10* (2013.01); *B32B 2367/00* (2013.01); *B32B 2375/00* (2013.01); *B32B 2551/00* (2013.01); *B82B 1/001* (2013.01); *G02B 5/1847* (2013.01)

(58) Field of Classification Search
CPC ....... B32B 17/10; B32B 27/08; B32B 27/308; B32B 27/32; B32B 27/36; B32B 27/40; B32B 37/12; B32B 37/24; B32B 38/0008; B32B 38/06; B32B 2307/7376; B32B 2037/243; B32B 2255/10; B32B 2255/20; B32B 2270/00; B32B 2305/74; B32B 2310/0831; B32B 2311/24; B32B 2315/08; B32B 2323/10; B32B 2367/00; B32B 2375/00; B32B 2551/00; B82B 1/001; G02B 5/1847
See application file for complete search history.

(56) References Cited

U.S. PATENT DOCUMENTS

| | | | |
|---|---|---|---|
| 6,696,157 B1 | 2/2004 | David et al. | |
| 7,799,888 B2 | 9/2010 | Arkles et al. | |
| 8,012,567 B2 | 9/2011 | Gaides et al. | |
| 8,460,568 B2 | 6/2013 | David et al. | |
| 8,530,572 B2 | 9/2013 | Kolb | |
| 8,664,323 B2 | 3/2014 | Iyer et al. | |
| 9,029,586 B2 | 5/2015 | Arkles et al. | |
| 9,138,977 B2 | 9/2015 | Dumond et al. | |
| 9,254,506 B2 | 2/2016 | Roehrig et al. | |
| 9,360,591 B2 | 6/2016 | Hunt et al. | |
| 9,709,704 B2 | 7/2017 | Miyahara et al. | |
| 9,790,396 B2 | 10/2017 | Klun et al. | |
| 9,982,160 B2 | 5/2018 | Klun et al. | |
| 10,011,735 B2 | 7/2018 | Klun et al. | |
| 2010/0034976 A1* | 2/2010 | Fregonese | C09D 183/04 427/387 |
| 2011/0296726 A1 | 12/2011 | Rinko | |
| 2012/0038990 A1 | 2/2012 | Hao et al. | |
| 2013/0025674 A1 | 1/2013 | Rinko | |
| 2013/0229378 A1 | 9/2013 | Iyer et al. | |
| 2014/0193612 A1 | 7/2014 | Yu et al. | |
| 2015/0203707 A1 | 7/2015 | Klun et al. | |
| 2015/0213990 A1 | 7/2015 | Spagnola et al. | |
| 2015/0218294 A1 | 8/2015 | Klun et al. | |
| 2016/0318277 A1* | 11/2016 | Schwartz | H10K 77/10 |
| 2018/0292066 A1 | 10/2018 | Rinko | |
| 2019/0157622 A1* | 5/2019 | Nawata | G02B 5/3025 |
| 2020/0017623 A1 | 1/2020 | Ye et al. | |
| 2022/0011471 A1 | 1/2022 | Doshay et al. | |

FOREIGN PATENT DOCUMENTS

| | | |
|---|---|---|
| WO | 2017205174 A1 | 11/2017 |
| WO | 2019032635 A1 | 2/2019 |
| WO | 2020046654 A1 | 3/2020 |
| WO | 2021053534 A1 | 3/2021 |
| WO | 2021220096 A1 | 11/2021 |

OTHER PUBLICATIONS

Burzynski, "Large Optical Birefringence in Poly (P-Phenylene Vinylene) Films Measured by Optical Waveguide Techniques", Polymer, 1990, vol. 31 No. 4, pp. 627-630.
International Search Report for PCT International Application No. PCT/IB2021/056879, mailed on Oct. 18, 2021, 5 pages.
Kang, "Micro/Nano Replication-Processes and Applications—Chapters 1: Introduction", John Wiley & Sons, Inc., (2012), pp. 1-21.
Kang, "Micro/Nano Replication-Processes and Applications—Chapters 5: Hot Embossing of Microstructured Surfaces and Thermal Nanoimprinting", John Wiley & Sons, Inc., (2012), pp. 123-156.
Kang, "Micro/Nano Replication-Processes and Applications—Chapters 6: UV-Imprinting Process and Imprinted Micro Nanostructures", John Wiley & Sons, Inc., (2012), pp. 157-195.
Kango, Surface modification of inorganic nanoparticles for development of organic-inorganic nanocomposites—A review, Progress in Polymer Science, XP028575736, Mar. 2013 vol. 38, No. 8, pp. 1232-1261.
Ni, "Electrochemical deposition characteristics of p-CuSCN on n-ZnO rod arrays films", Electrochimica Acta, XPO22687804, Electrochimica Acta, Aug. 2008, vol. 53, No. 20, pp. 6048-6054.
Rao, "Tough Hydrogels with Fast, Strong, and Reversible Underwater Adhesion Based on a Multiscale Design", Advanced Materials, XP055848154, Jun. 2018, vol. 30, No. 32 pp. 1801884(1-8).
Wang, "Constructing Ordered Sensitized Heterojunctions: Bottom-Up Electrochemical Synthesis of p-Type Semiconductors in Oriented n-TiO2 Nanotube Arrays", Nano Letters, XP055848152, Jan. 2009, vol. 9, No. 2, pp. 806-813.

(56) References Cited

OTHER PUBLICATIONS

Yang, "Group Contribution to Molar Refraction and Refractive Index of Conjugated Polymers", Chemistry of Materials, 1995, vol. 7, No. 7, pp. 1276-1285.

* cited by examiner

ARTICLES INCLUDING NANOSTRUCTURED SURFACES AND ENCLOSED VOIDS, METHODS OF MAKING SAME, AND OPTICAL ELEMENTS

TECHNICAL FIELD

The present disclosure broadly relates to articles including nanostructured surfaces and methods of making such articles.

BACKGROUND

Nanostructured surfaces can provide optical effects useful for a variety of applications such as improving the color and efficiency of devices. A refractive index difference or contrast is required at the nanostructured interface for the nanostructured surface to provide the desired optical functionality. The nanostructured surface can be exposed to the ambient environment to provide the refractive index contrast; however, the exposed surface limits attachment of the nanostructured surface to other surfaces and is susceptible to damage and/or contamination from the environment. Thus, there remains a need for improvements in protecting nanostructured surfaces.

SUMMARY

In a first aspect, an article is provided. The article includes a) a first layer including a nanostructured first surface including nanofeatures and an opposing second surface; and b) a second layer comprising a first major surface and an opposing second major surface, the first major surface bonded to a portion of the nanostructured first surface of the first layer, wherein the second layer includes an inorganic material. The nanostructured first surface includes recessed features, or protruding features formed of a single composition, or both recessed and protruding features. The article includes at least one enclosed void defined in part by the nanostructured first surface of the first layer.

In a second aspect, an optical element is provided, including the article according to the first aspect.

In a third aspect, a method of making an article is provided. The method includes: a) obtaining a first layer including a nanostructured first surface including nanofeatures and an opposing second surface; b) treating a first major surface of a second layer with a coupling agent to bond the coupling agent with the second layer, wherein the first major surface of the second layer includes an inorganic material; c) contacting the treated first major surface of the second layer with a portion of the nanostructured first surface of the first layer; and d) bonding at least one of the first layer or the coupling agent bonded with the second layer to bond the first layer and the second layer together through a bonded coupling agent. The bonded coupling agent directly bonds the first major surface of the second layer to the nanostructured first surface of the first layer or is present as a portion of a coupling agent layer. The nanostructured first surface includes recessed features, or protruding features formed of a single composition, or both recessed and protruding features. The nanofeatures of the first layer and the first major surface of the second layer together define at least one void.

Articles and methods according to at least certain embodiments of the present disclosure provide an enclosed nanostructured surface that protects the nanostructured surface and maintains the refractive index contrast of the air interface.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Figure 1:
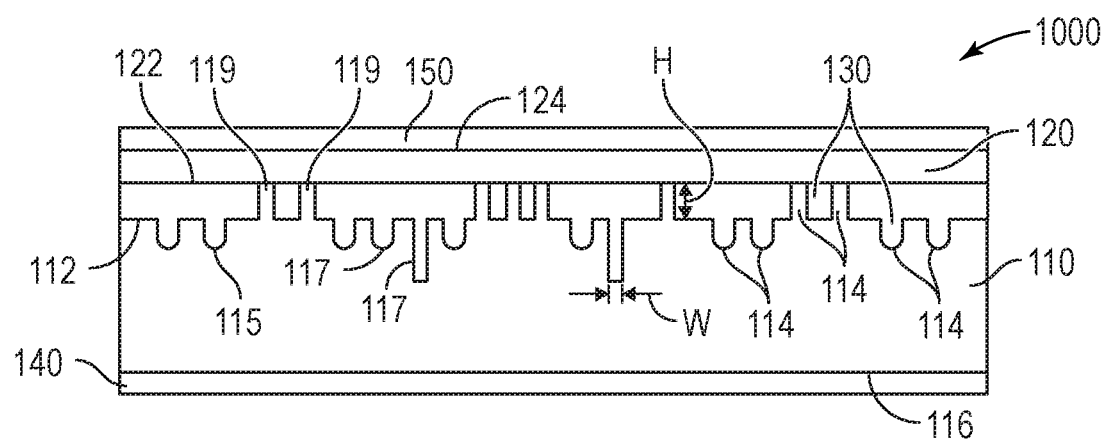
FIG. 1 is a schematic cross-sectional view of an exemplary article according to the present application.

While the above-identified figures set forth several embodiments of the disclosure, other embodiments are also contemplated, as noted in the description. The figures are not necessarily drawn to scale. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION OF ILLUSTRATIVE EMBODIMENTS

Glossary

The term "adjacent" as used herein refers to a material or a layer that can either be in contact with another material or layer (i.e., directly adjacent), or separated from another material or layer by an intermediary material, layer, or gap.

The phrase "in planar contact" or "planarly contacting" is used to indicate that one layer or layered structure is contacting (and disposed either above or below) another layer or layered structure. Such contact is facial contact, rather than edge contact.

The term "organic layer" as used herein refers to a layer that comprises a majority (e.g., greater than 50 weight percent) of one or more materials including hydrocarbon compounds or their halogenated analogues, a three-dimensionally continuous polymeric matrix, or both.

The term "inorganic layer" as used herein refers to a layer that comprises a majority (e.g., greater than 50 weight percent) of one or more materials lacking compounds having carbon-hydrogen bonds or their halogenated analogues.

As used herein, "nanostructured" refers to a surface that includes topography in the form of nanofeatures having an engineered pattern, wherein the nanofeatures comprise material that defines the surface, and wherein at least one of the height of nanofeatures or the width of nanofeatures is less than about a micron (i.e., a micrometer, or 1000 nanometers) and 10 nanometers or greater.

As used herein, "index of refraction" refers to a refractive index of a material in the plane of the material with respect to light at 633 nm and normal incidence, unless otherwise indicated.

As used herein, "gas" refers to any material in the gaseous phase at standard temperature and pressure (i.e., 0 degrees Celsius and $10^5$ pascals).

As used herein, "birefringent" means that the indices of refraction in orthogonal x, y, and z directions are not all the same. Index of refraction is designated as $n_x$, $n_y$, and $n_z$ for x, y, and z directions, respectively. For the layers described herein, the axes are selected so that x and y axes are in the plane of the layer and the z axis is normal to the plane of the layer and typically corresponds to the thickness or height of the layer. Where a refractive index in one in-plane direction is larger than a refractive index in another in-plane direction, the x-axis is generally chosen to be the in-plane direction with the largest index of refraction.

As used herein, "transparent to visible light" refers to the level of transmission of the unpatterned substrate or of the article being 60 percent or more, 70 percent or more, 80 percent or more, 90 percent or more, 95 percent or more, or 98 percent or more transmissive to at least one polarization state of visible light, where the percent transmission is normalized to the intensity of the incident, optionally polarized light. The term "visible" in connection with "transparent to visible light" is modifying the term "light," so as to specify the wavelength range of light for which the article is transparent.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

Articles

In a first aspect, an article is provided. The article comprises:
  a) a first layer comprising a nanostructured first surface comprising nanofeatures and an opposing second surface, wherein the nanostructured first surface comprises recessed features, or protruding features formed of a single composition, or both recessed and protruding features; and
  b) a second layer comprising a first major surface and an opposing second major surface, the first major surface bonded to a portion of the nanostructured first surface of the first layer, wherein the article comprises at least one enclosed void defined in part by the nanostructured first surface of the first layer, and wherein the second layer comprises an inorganic material.

It has been discovered that it is possible to form an article containing one or more voids and exhibiting a refractive index difference, in which the nanostructured surface is protected from damage or contamination.

FIG. 1 is a schematic cross-sectional view of an exemplary article 1000 according to the present application. The article 1000 comprises a first layer 110 comprising a nanostructured first surface 112 comprising nanofeatures 114 and an opposing second surface 116; and a second layer 120 comprising a first major surface 122 bonded to a portion of the nanostructured first surface 112 (in this case, bonded to a portion of the nanofeatures 114), wherein the second layer 120 is an inorganic layer. The nanostructured first surface comprises recessed features, or protruding features formed of a single composition, or both recessed and protruding features. By a "single composition" is meant that the protruding features are made of the same material throughout the protruding feature instead of including one portion of a feature having a differing composition than another portion of the same feature. In some embodiments, the protruding features have the same composition as the (e.g., bulk of) the first layer 110. In some embodiments, the recessed features are defined by a structure that is formed of a single composition (e.g., the first layer). In some embodiments, the composition can be, for instance, a polymer, a polymer blend, and/or a polymeric matrix containing nanoparticles dispersed in the polymeric matrix. An advantage of the protruding features consisting of one composition is that often the protruding features can be formed by a relatively simple nanoreplication method, e.g., as described in the Examples below with respect to Film A.

In this embodiment, the nanofeatures 114 of the first layer 110 and the first major surface 122 of the second layer 120 together define at least one void 130 (e.g., in the form of the negative space between the first layer 110 and the second layer 120). The enclosed void(s) 130 are not filled with a solid or liquid, but rather contain a vacuum or a gas. Suitable gases include for example ambient air (e.g., atmospheric air in its natural state), a gas, or a gas blend (e.g., 90% nitrogen and 10% oxygen). In some embodiments, suitable gases can include at least one inert gas (e.g., nitrogen, argon, helium, xenon, etc.). In the embodiment shown in FIG. 1, the nanostructured first surface 112 comprises both recessed features 117 and protruding features 119. Alternatively, an article can include just one of recessed features 117 or protruding features 119. An advantage of using only recessed features is that the second layer can contact a major surface of the first layer rather than the tops of a number of protruding features, and the resulting article may be less fragile than one having protruding features. The embodiment shown in FIG. 1 includes both individual voids 130 provided in recessed features 117 and a large connected void 130 that extends around a plurality of protruding features 119.

Figure 2A:
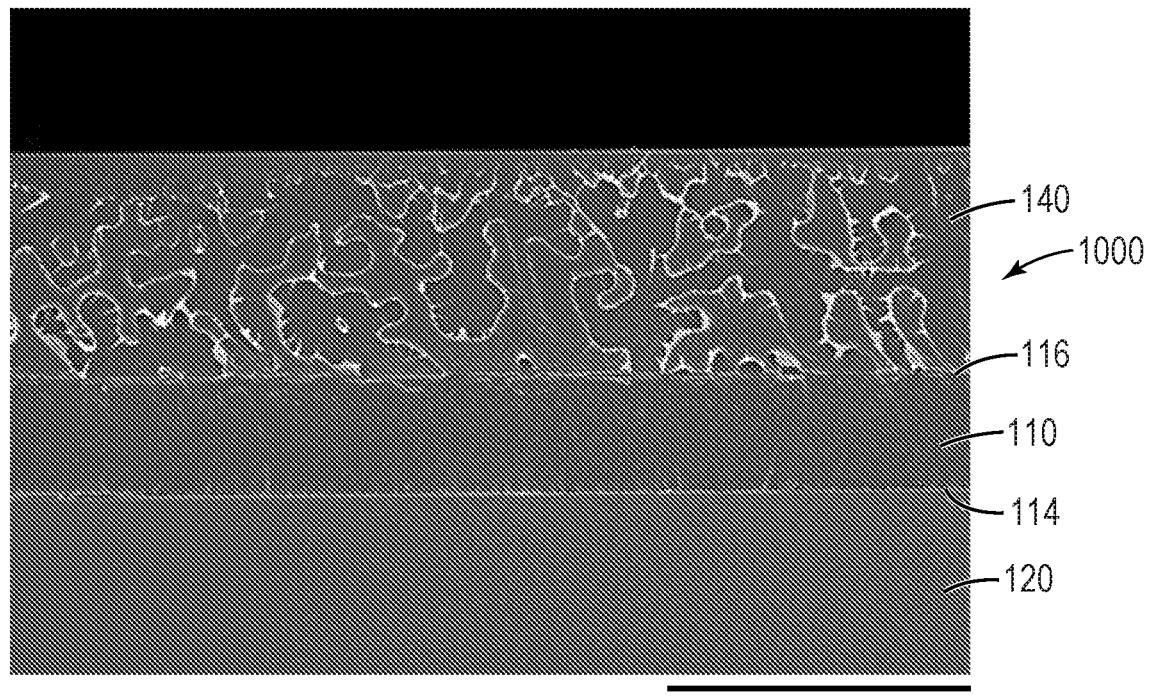
FIG. 2A is a scanning electron microscopy (SEM) image of a cross-section of the exemplary article of Example 1 at a magnification of 2,000×, according to the present application.
Figure 2B:
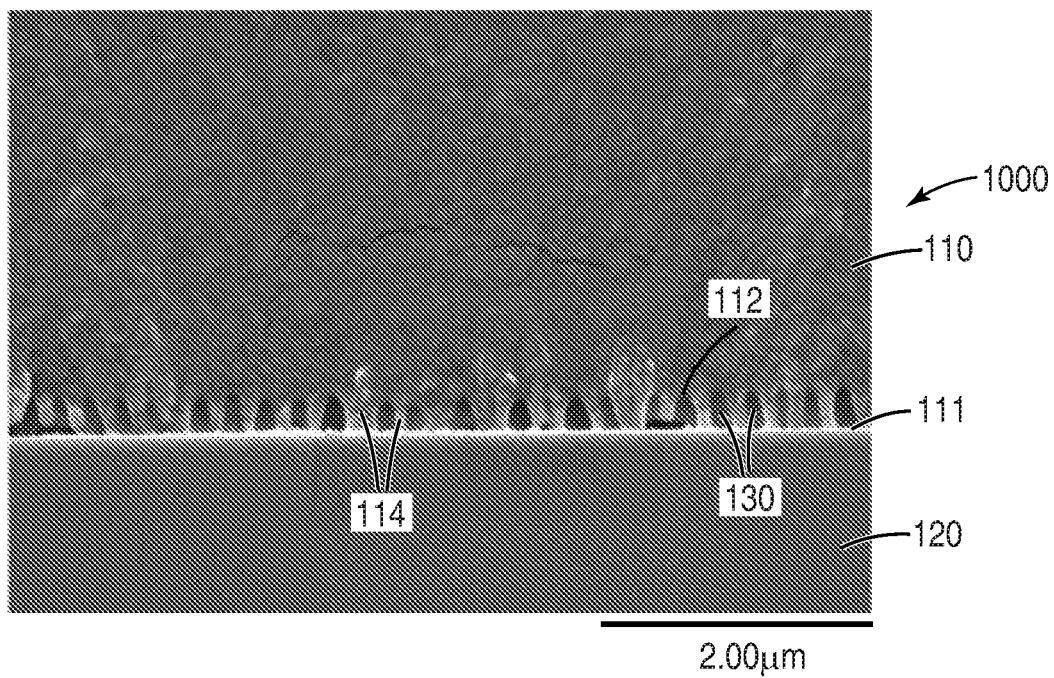
FIG. 2B is an SEM image of a cross-section of the exemplary article of FIG. 2A at a magnification of 20,000×.
Figure 2C:
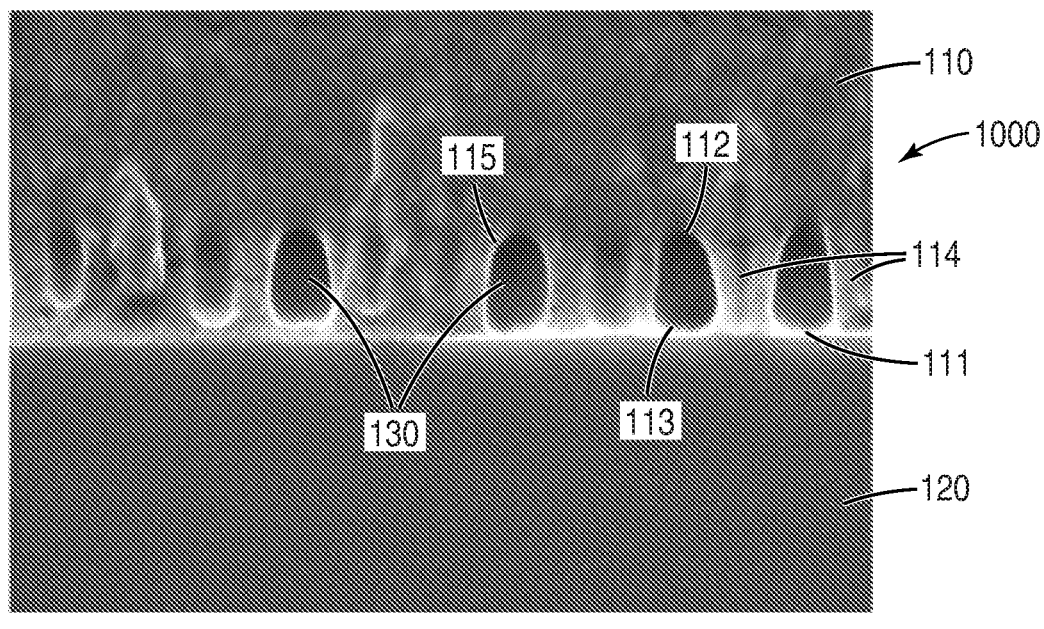
FIG. 2C is an SEM image of a cross-section of the exemplary article of FIG. 2A at a magnification of 50,000×.

FIGS. 2A-2C provide SEM images of three magnifications of an article 1000 made according to Example 1 below. Referring to FIG. 2A (i.e., magnification of 2,000×), the article 1000 comprises a first layer 110 comprising a plurality of nanofeatures 114, and a second layer 120 attached to a portion of the nanostructured surface of the first layer 110 (i.e., attached to a portion of the nanofeatures 114). The first layer 110 has a thickness of about 8 micrometers. This article 1000 further comprises a third layer 140 attached to an opposing second surface 116 of the first layer 110. The third layer 140 comprises glycol modified polyethylene terephthalate (PETg) having a thickness of about 15 micrometers. Referring to FIG. 2B (i.e., magnification of 20,000×), the first layer 110, a nanostructured first surface 112 comprising the nanofeatures 114, a second layer 120, and a coupling agent layer 111 attached to a portion of the nanofeatures 114. In the embodiment of FIG. 2B, one connected void 130 is present that surrounds many, most, or all of the (e.g., protruding) nanofeatures 114. Referring to FIG. 2C (i.e., magnification of 50,000×), the shapes of some of the nanofeatures 114 are seen more clearly.

Optionally, the second layer 120 may be substantially planar. As used herein, "substantially planar" with respect to a layer means that a surface of the layer is essentially free of recesses and/or protrusions extending above and/or below a plane of the layer, the recesses and/or protrusions having a depth or height of greater than 100 micrometers, 90 micrometers, 80 micrometers, 70 micrometers, 60 micrometers, 50 micrometers, 40 micrometers, 30 micrometers, 25 micrometers, 20 micrometers, 15 micrometers, 10 micrometers, 9 micrometers, 8 micrometers, 7 micrometers, 6 micrometers, 5 micrometers, 4 micrometers, 3 micrometers, 2 micrometers, or greater than 1 micrometer. Typically, recesses and/or protrusions have a depth or height of less than 1 millimeter, such as 900 micrometers or less, 800 micrometers, 700 micrometers, 600 micrometers, 500 micrometers, 400 micrometers, or 300 micrometers or less. The depth or height of a recess or a protrusion present on a layer surface can be measured with a confocal microscope.

In some embodiments, the first layer is an organic layer, such as a polymeric layer. The first layer 110 may comprise a crosslinked material or a crosslinkable material. The first layer 110 may have a refractive index in the range of 1.2 to 2.2, or in the range of 1.4 to 1.75, for example. The refractive index refers to the refractive index measured at 632 nm, unless specified differently or unless the context clearly indicates differently. In some embodiments, the first layer 110 has a refractive index of 1.3 or greater, 1.5 or greater, 1.6 or greater, 1.7 or greater, or 1.75 or greater; and a refractive index of 2.2 or less, 2.1 or less, or 2.0 or less. The article 1000 provides a refractive index contrast (absolute value of the difference in the refractive index of the first layer 110 and the refractive index of the void(s) 130). In some embodiments, the refractive index contrast is in a range of 0.1 to 1.0, 0.3 to 1.0, or 0.5 to 1.0.

Nanostructures are structures having at least one dimension, such as width or height, less than 1 micrometer and greater than or equal to ten nanometers, plus have an engineered shape and pattern (e.g., having a deliberate design instead of being the result of naturally occurring nanoscale roughness of the material). Nanostructured surfaces can be made using a tool having a nanostructured surface. In some embodiments, the tool includes a plurality of particles partially embedded in a substrate. Useful techniques for making the tool are described in U.S. Publication No. 2014/0193612 (Yu et al.) and U.S. Pat. No. 8,460,568 (David et al.). The nanostructured surface of the tool can be characterized by atomic force microscopy (AFM). Further details on useful nanostructured surfaces and methods of making the nanostructured surfaces can be found as described in PCT Publication Nos. WO 2009/002637A2 (Zhang et al.) and WO 2017/205174 (Freier et al.). Referring to FIG. 2C, an SEM of a first layer 110 is shown. The first layer 110 comprises a nanostructured first surface 112 comprising nanofeatures 114.

Examples of characteristics of nanofeatures include pitch, height, depth, aspect ratio, diameter, sidewall angle, and shape. Pitch refers to the distance between adjacent nanofeatures, typically measured from the centers of their topmost portions for protruding nanofeatures or from the centers of their bottommost portions for recessed nanofeatures. Height refers to the height of protruding nanofeatures measured from their base (in contact with the underlying layer) to the topmost portion. Depth refers to the depth of recessed nanofeatures measured from their topmost portion (the opening at a major surface of the layer) to the lowermost portion. Aspect ratio refers to the ratio of the cross-sectional width (widest portion) to height or depth of the nanofeatures. Diameter refers to the longest line that can be drawn across a nanofeature from one surface, through a center point, and to an opposing surface at a point along the height or depth of a nanofeature. Sidewall angle refers to the minimum angle formed between a sidewall of a nanofeature and the major surface of the layer from which the nanofeature protrudes or into which the nanofeature recedes. The sidewall angle may differ at various points along the height or depth of a nanofeature. Shape refers to the cross-sectional shape of the nanofeatures. Optionally, the cross-sectional shapes (and diameters) may differ at various points along the height or depth of a nanofeature.

As shown in FIG. 1, in certain embodiments, the nanostructured first surface 112 of the first layer 110 comprises nanofeatures 114 having a regular height H, whereas in other embodiments the nanostructured first surface 112 of the first layer 110 comprises nanofeatures 114 having varying heights. This can depend on the method of forming the nanostructured surface. Referring again to FIG. 1, at least one dimension of height H or width W of the nanofeatures 114 is less than a micrometer, to provide the required small size of the features. In some embodiments, a (e.g., average) height H of the nanofeatures 114 is less than a micrometer, 950 nanometers (nm) or less, 900 nm or less, 850 nm or less, 800 nm or less, 750 nm or less, 700 nm or less, 650 nm or less or 600 nm or less; and a height H of the nanofeatures 114 is 10 nm or greater, 15 nm or greater, 20 nm or greater, 30 nm or greater, 50 nm or greater, 75 nm or greater, 100 nm or greater, 150 nm or greater, 200 nm or greater, 250 nm or greater, 300 nm or greater, 350 nm or greater, 400 nm or greater, 450 nm or greater, or 500 nm or greater. In some embodiments, a (e.g., average) width W of the nanofeatures 114 is less than a micrometer, 950 nanometers (nm) or less, 900 nm or less, 850 nm or less, 800 nm or less, 750 nm or less, 700 nm or less, 650 nm or less or 600 nm or less; and a width W of the nanofeatures 114 is 10 nm or greater, 15 nm or greater, 20 nm or greater, 30 nm or greater, 50 nm or greater, 75 nm or greater, 100 nm or greater, 150 nm or greater, 200 nm or greater, 250 nm or greater, 300 nm or greater, 350 nm or greater, 400 nm or greater, 450 nm or greater, or 500 nm or greater.

The nanostructured surfaces can each comprise nanofeatures such as, for example, nano-columns, or continuous nano-walls comprising nano-columns. Referring to each of FIG. 1 and FIG. 2C, in certain embodiments, the nanofeatures 114 comprise at least one non-linear surface 115 in at least one direction. For instance, some of the nanofeatures 114 shown in FIG. 1 have a curved surface 115 (e.g., at a lower surface of the recessed features 114), and at least some of the nanofeatures 114 shown in FIG. 2C have a curved surface 115 (e.g., at a side wall surface of the protruding features 114). Any shape conveniently formed by a nanoreplication process can be employed for the nanofeatures 114 (e.g., prisms, ridges, linear and/or curved polygons). As used herein, "nanoreplication" refers to a process of molding a nanostructured surface from another nanostructured surface using, for example, curable or thermoplastic materials. Nanoreplication is further described, for instance, in "Micro/Nano Replication", Shinill Kang, John Wiley & Sons, Inc., 2012, Chapters 1 and 5-6. The nanofeatures optionally have steep side walls that are generally perpendicular to the opposing second surface of the first or second layer. Certain individual nanofeatures can be spaced equally in one direction along the nanostructured first surface but not in an orthogonal direction. In some embodiments, certain individual nanofeatures are spaced equally in at least two directions and along the nanostructured first surface. Certain individual nanofeatures may not be spaced equally in either direction along the nanostructured first surface or in an orthogonal direction.

As mentioned above, the second layer 120 comprises an inorganic material. Suitable inorganic materials are not limited to silicon oxide, but can comprise an oxide, a nitride, a carbide, or a boride of a metal or a nonmetal, or combinations thereof. In some embodiments, the inorganic material comprises an oxide of titanium, indium, tin, tantalum, zirconium, niobium, aluminum, silicon, or combinations thereof. For instance, suitable oxides include silica, aluminum oxides such as alumina, titanium oxides such as titania, indium oxides, tin oxides, indium tin oxide (ITO), hafnium oxide, tantalum oxide, zirconium oxide, niobium oxide, and combinations thereof. In some embodiments, the inorganic material comprises glass.

In some embodiments, the inorganic material is present in the form of a self-supporting layer. In some embodiments, the inorganic material is in the form of a coating or layer that is not self-supporting, and wherein the second layer comprises the inorganic material supported on a polymeric material. For instance, the inorganic material may be deposited on a polymeric material using sputter deposition, reactive sputtering, chemical vapor deposition (CVD), physical vapor deposition, atomic layer deposition (ALD), evaporation, plasma deposition, or plasma-enhanced evaporation, plasma-enhanced CVD, plasma-enhanced ALD, or any combination thereof. In some embodiments, the inorganic material may be coated on a polymeric material using liquid coating techniques. This includes liquids containing inorganic particles or reactive precursors that can form inorganic materials such as sol-gel precursors or form hybrid inorganic/organic materials. In any embodiment, the second layer has an average thickness of greater than 1 nm, such as 2 nm or greater, 3 nm or greater, 5 nm or greater, 7 nm or greater, 10 nm or greater, 15 nm or greater, 20 nm or greater, 25 nm or greater, 30 nm or greater, 35 nm or greater, 40 nm or greater, 50 nm or greater, 60 nm or greater, 75 nm or greater, 100 nm or greater, 200 nm or greater, 300 nm or greater, 400 nm or greater, 500 nm or greater, 700 nm or greater, 900 nm or greater, 1 micrometer or greater, 1.25 micrometers or greater, 1.5 micrometers or greater, 1.75 micrometers or greater, 2 micrometers or greater, 2.25 micrometers or greater, 2.5 micrometers or greater, 2.75 micrometers or greater, or 3 micrometers or greater; and an average thickness of 1 millimeter (mm) or less, 0.75 mm or less, 0.5 mm or less, 0.25 mm or less, 0.1 mm or less, 0.05 mm or less, or 0.01 mm or less. In select embodiment, the second layer is nonporous.

Typically, coupling agents include at least one group that bonds (covalently or non-covalently) with an organic layer, and at least one group that bonds (covalently or non-covalently) to an inorganic layer. Covalent bonding requires that the group reacts with the surface with which it is in contact. For instance, for the coupling agent 2-(3-trimethoxysilylpropylcarbamoyloxy)ethyl prop-2-enoate (K90) having the below structure,

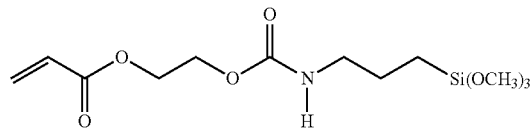

the acrylate group can react with other acrylates in the organic layer adjacent to it to form an acrylate copolymer. Other functional groups that may bond (covalently or non-covalently) with (meth)acrylate coatings may include (meth)acrylate, vinyl, amine, urethane, urea, and thiol functional groups. Likewise, the trimethoxysilyl group can react with one or more metal M (e.g., silicon, aluminum) hydroxide groups of the inorganic layer adjacent to it, e.g., once, twice or three times, to form —Si—O-M- linkages. Other groups, for example acid groups such as carboxylic acid, sulfonic acid, phosphonic acid, or phosphoric acid groups, may be non-covalently bonded via hydrogen bonding with moieties in either the organic or inorganic layers to which the coupling agent is adjacent. The coupling agent before bonding to at least one surface is a distinct compound, and after bonding to at least one surface may be referred to as a "bonded coupling agent". Accordingly, any inorganic atom, such as silicon, phosphorous, titanium, or zirconium, may still be a part of the bonded coupling agent. When such an inorganic atom is not the same as the metal M, in some embodiments its presence may be detectable by analytical methods.

Suitable coupling agents include for instance and without limitation, functional silanes with hydrolysable alkoxy or chlorinated groups bonded to silicon atoms, with (meth) acrylic silane coupling agents being particularly useful. Such coupling agents are commercially available from Momentive, Gelest, Evonik, Shin-Etsu, and others. Suitable silane materials may include functional groups that bond (covalently or non-covalently) with (meth)acrylate coatings, including (meth)acrylate, vinyl, amine, urethane, urea, and thiol functional groups. Suitable materials may include functional groups that bond (covalently or non-covalently) with inorganic layers such as hydrolysable silane groups, acids, (including phosphoric, phosphonic, sulfonic acid, and carboxylic acid groups) and other groups such as phenols, polyphenols, amines, alcohols and thiols. Included are acrylic silane coupling agent 2-(3-trimethoxysilylpropylcarbamoyloxy)ethyl prop-2-enoate, and others given in U.S. Pat. No. 7,799,888 (Arkles et al.); U.S. Pat. No. 9,029,586 (Arkles et al.); U.S. Pat. No. 9,254,506 (Roehrig et al.); U.S. Pat. No. 9,790,396 (Klun et al.); U.S. Pat. No. 9,982,160 (Klun et al.); U.S. Pat. No. 10,011,735 (Klun et al.), and U.S. Patent Application Publication Nos. 2015/0203707 (Klun et al.) and 2015/0218294 (Klun et al.). Additionally, suitable coupling agents having phosphonic acid groups include those given in U.S. Patent Application Publication No. 2020/0017623 (Ye et al.) and International Application Publication No. WO 2020/046654 (Lin et al.).

A coupling agent is often first bonded with the second layer covalently or non-covalently, followed by bonding at least one of the first layer or the coupling agent bonded with the second layer to bond the first layer and the second layer together through a bonded coupling agent. Alternatively, the bonded coupling agent may be formed when the coupling agent bonds with one of the first layer or the second layer and also bonds with another coupling agent compound or other photoreactive component present (e.g., monomer, oligomer, or polymer). This is more likely when the coupling agent is present as part of a coupling agent layer that is at least as thick as the length of the coupling agent compound (or thicker).

Optionally, the bonded coupling agent comprises at least one of silicon, phosphorous, titanium, or zirconium. In some embodiments, the bonded coupling agent comprises at least one functional group selected from an acrylate, a urethane, a urea, an alkylene, a ureido, an isocyanate, an epoxy, an alcohol, an amine, a thiol, a phenol, an amino, an acid, a heteroatom, and at least one of silicon, phosphorous, titanium, or zirconium.

When the nanostructured first surface of the first layer comprises protruding nanofeatures, the bonded coupling agent is bonded to a portion of the protruding nanofeatures. When nanofeatures of the nanostructured first surface of the first layer are all recessed nanofeatures, the bonded coupling agent is bonded to a portion of a major surface of the first layer. In some embodiments, the first major surface of the second layer is covalently bonded to a portion of the nanostructured first surface of the first layer via a bonded coupling agent. As used herein, the term "residue" is used to define the portion of a coupling agent remaining after removal of the groups that can form bonds (covalent bonds or non-covalent) to the first and second layers. Typically, covalent bonds are stronger than non-covalent bonds.

As mentioned above, the bonded coupling agent only becomes a residue when both end groups are removed during reaction. For example, the "residue" of coupling agent 2-(3-trimethoxysilylpropylcarbamoyloxy)ethyl prop-2-enoate (K90) shown below:

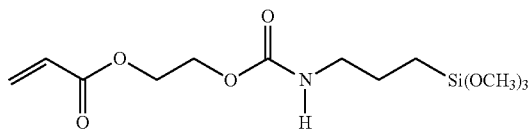

is —CH$_2$CH$_2$OC(O)NHCH$_2$CH$_2$CH$_2$—.
Another exemplary coupling agent is

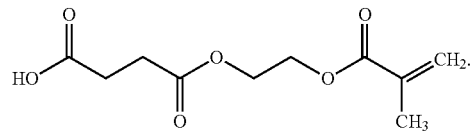 [SMILES: C=C(C)C(=O)OCCOC(=O)CCC(=O)O]

The residue for this coupling agent is —CH$_2$CH$_2$OC(O)CH$_2$CH$_2$—.

In some cases, such as for

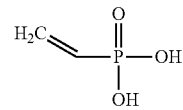

the coupling agent residue is a covalent bond.

The residue of the coupling agent is the "core" of the coupling agent remaining after reaction of the end functional groups with the first layer and the second layer.

In some embodiments, the bonded coupling agent is present as a coupling agent layer having a thickness of less than 100 nanometers (nm), 90 nm, 80 nm, 70 nm, 60 nm, 50 nm, 40 nm, 30 nm, or less than 25 nm; and having a thickness of 5 nm or greater. In such embodiments, the at least one enclosed void is defined by the nanostructured first surface of the first layer and a first major surface of the coupling agent layer. For instance, referring to FIGS. 2B-2C, the bonded coupling agent is present as a coupling agent layer 111 and the enclosed voids 130 are defined by the nanostructured first surface 112 of the first layer 110 and a first major surface 113 of the coupling agent layer 111. In such embodiments, often, molecules of coupling agent located at or near the first major surface of the coupling agent layer will bond to the nanostructured first surface of the first layer while other molecules of coupling agent located at or near an opposing major surface of the coupling agent layer will bond to the first major surface of the second layer. In coupling agent layers of greater thickness, more molecules of coupling agent will be located between the two major surfaces of the coupling agent layers than in coupling agent layers of lesser thickness. Optionally, coupling agent molecules located within the bulk of the coupling agent layer are bonded to each other and/or other photoreactive components during bonding of the first layer and the second layer together.

In some embodiments, the bonded coupling agent directly bonds the first major surface of the second layer to the nanostructured first surface of the first layer. In such embodiments, the at least one enclosed void is defined by the nanostructured first surface of the first layer and the first major surface of the second layer.

Referring again to FIG. 1, in the embodiment shown, the article 1000 further comprises a third layer 140 attached to the opposing second surface 116 of the first layer 110. In some embodiments, the article 1000 further comprises a fourth layer 150 attached to a second major surface 124 of the second layer 120. Suitable third layers and/or fourth layers comprise inorganic materials and organic materials; in some embodiments the third layer 140, the fourth layer 150, or both comprise a polymeric layer. Either or both of the third or fourth layers may be referred to as substrates. Suitable materials for a polymer substrate include copolyester polymers such as polyethylene terephthalate (PET) and glycol modified polyethylene terephthalate (PETg), cyclo-olefin polymer (COP), cyclo-olefin copolymer (COC), poly (ethylenenaphthalate) (PEN), polycarbonate (PC), acrylate polymers such as alicyclic acrylate or poly(methylmethacrylate) (PMMA), polyimide (PI), polysulfone, and cast cellulose diacetate, and mixtures or copolymers including these materials. A thickness of a substrate is not particularly limited, and may range from a thickness of 1 micrometer to 1 centimeter, 5 micrometers to 1 centimeter, 10 micrometers to 500 millimeters, or 50 micrometers to 250 millimeters. Stated another way, the polymer substrate may have a thickness of 1 micrometer or more, 2 micrometers or more, 3 micrometers or more, 5 micrometers or more, 7 micrometers or more, 10 micrometers or more, 20 micrometers or more, 35 micrometers or more, 50 micrometers or more, 75 micrometers or more, 100 micrometers or more, 250 micrometers or more, 500 micrometers or more, 750 micrometers or more, or 1 millimeter or more; and 1 centimeter or less, 9 millimeters or less, 8 millimeters or less, 7 millimeters or less, 6 millimeters or less, 5 millimeters or less, 3.5 millimeters or less, 2.5 millimeters or less, 1 millimeter or less, 0.50 millimeters or less, 0.25 millimeters or less, or 0.10 millimeters or less. Further, additional suitable substrates could include painted or graphics-printed substrates including metals, plastics, and glass.

In certain embodiments, one or both of the third layer 140 or the fourth layer 150 comprises a polymeric film. A polymeric "film" is a polymer material in the form of a generally flat sheet that is sufficiently flexible and strong to be processed in a roll-to-roll fashion. Polymeric films used in articles described herein are sometimes referred to as base films. By roll-to-roll, what is meant is a process where material is wound onto or unwound from a support, as well as further processed in some way. Examples of further processes include coating, laminating, slitting, blanking, and exposing to radiation, or the like. Polymeric films can be manufactured in a variety of thicknesses, ranging in general from about 5 micrometers to 1000 micrometers. Similarly, the first layer can comprise a film that is generally flat other than the nanostructured surface.

Optionally, one or both of the third layer 140 or the fourth layer 150 comprises a low-birefringent layer. By "low-birefringent" is meant a layer that has an optical phase retardation of 25 nm or less at one or more wavelengths of interest (e.g., visible or infrared wavelengths). The optical phase retardation of a layer could be measured using a polarimeter such as the AXOSCAN Mueller Matrix Polarimeter (available from Axometrics Inc. Huntsville, AL). Suitable materials for a low-birefringent layer include for instance polysulfone, acrylate polymers such as polymethyl methacrylate and alicyclic acrylate, polycarbonate polymers, cycloolefin polymers and copolymers, copolyester polymers (e.g., PETg), and cast cellulose diacetate.

Preferably, the article is transparent to visible light. An advantage to having the article transparent to visible light is its suitability for numerous applications. For instance, the article may be useful as an optical element, such as a diffraction grating, or in augmented reality waveguide applications.

Examples of suitable materials for the first layer 110 include the following: high index organic materials; a nanoparticle filled polymer material; polymers filled with high index inorganic materials; and high index conjugated polymers. Examples of high index polymers and monomers are described in C. Yang, et al., Chem. Mater. 7, 1276 (1995), and R. Burzynski, et al., Polymer 31, 627 (1990) and U.S. Pat. No. 6,005,137, all of which are incorporated herein by reference to the extent that they do not contradict the present description. Examples of polymers filled with high index inorganic materials are described in U.S. Pat. No. 6,329,058. Examples of nanoparticles for the nanoparticle filled polymer material include the following high index materials: $TiO_2$, $ZrO_2$, $HfO_2$, or other inorganic materials. In some embodiments, suitable materials for the first layer 110 include a low refractive index material, such as those described in U.S. Pat. No. 8,012,567 (Gaides et al.); or an ultralow refractive index material, such as those described in U.S. Pat. App. Pub. No. 2012/0038990 (Hao et al.). In select embodiments, the first layer 110 comprises an acrylic polymer or copolymer, such as at least one polymerizable component selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds.

In some embodiments, a polymerizable composition used for forming the first layer comprises (e.g. solely) a cross-linking agent as the (meth)acrylate monomer comprising at least three (meth)acrylate functional groups. In some embodiments, the crosslinking monomer comprises at least four, five or six (meth)acrylate functional groups. Acrylate functional groups tend to be favored over (meth)acrylate functional groups. Preferred commercially available cross-linking agents include for example trimethylolpropane triacrylate (commercially available from Sartomer Company, Exton, PA, under the trade designation "SR351"), ethoxylated trimethylolpropane triacrylate (commercially available from Sartomer Company, under the trade designation "SR454"), pentaerythritol tetraacrylate, pentaerythritol triacrylate (commercially available from Sartomer Company under the trade designation "SR444"), dipentaerythritol pentaacrylate (commercially available from Sartomer Company under the trade designation "SR399"), ethoxylated pentaerythritol tetraacrylate, ethoxylated pentaerythritol triacrylate (commercially available from Sartomer under the trade designation "SR494"), dipentaerythritol hexaacrylate, and tris(2-hydroxy ethyl) isocyanurate triacrylate (commercially available from Sartomer under the trade designation "SR368").

Useful multi-(meth)acrylate monomers and oligomers include:
  (a) di(meth)acryl containing monomers such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, and tripropylene glycol diacrylate;
(b) tri(meth)acryl containing monomers such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, and tris(2-hydroxyethyl)isocyanurate triacrylate; and
(c) higher functionality (meth)acryl containing monomers such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

In one embodiment, suitable polymerizable compositions include at least one monomeric or oligomeric (meth)acrylate, preferably a urethane (meth)acrylate. Typically, the monomeric or oligomeric (meth)acrylate is multi(meth)acrylate. The term "(meth)acrylate" is used to designate esters of acrylic and methacrylic acids, and "multi(meth)acrylate" designates a molecule containing more than one (meth)acrylate group, as opposed to "poly(meth)acrylate" which commonly designates (meth)acrylate polymers. Most often, the multi(meth)acrylate is a di(meth)acrylate, but it is also contemplated to employ tri(meth)acrylates, tetra(meth)acrylates and so on. Suitable monomeric or oligomeric (meth)acrylates include alkyl (meth)acrylates such as methyl acrylate, ethyl acrylate, 1-propyl acrylate, methyl methacrylate, 2-phenoxyethyl acrylate, tetrahydrofurfuryl acrylate, and t-butyl acrylate. The acrylates may include (fluoro)alkylester monomers of (meth)acrylic acid, the monomers being partially and or fully fluorinated, such as, trifluoroethyl (meth)acrylate.

Examples of commercially available multi(meth)acrylate resins include the DIABEAM series from Mitsubishi Rayon Co., LTD.; the DINACOL series from Nagase & Company, Ltd.; the NK ESTER series from Shin-Nakamura Chemical Co., Ltd.; the UNIDIC series from Dainippon Ink & Chemicals, Inc., the ARONIX series from Toagosei Co., LTD.; the BLENMER series manufactured by NOF Corp.; the KAYARAD series from Nippon Kayaku Co., Ltd., and the LIGHT ESTER series and LIGHT ACRYLATE series from Kyoeisha Chemical Co., Ltd.

Oligomeric urethane multi(meth)acrylates may be obtained commercially, for example from IGM Resins under the trade designation "PHOTOMER 6000 Series", such as "PHOTOMER 6010" and "PHOTOMER 6210", and also from Sartomer Company under the trade designation "CN 900 Series", such as "CN966B85", "CN964" and "CN972". Oligomeric urethane (meth)acrylates are also available from Surface Specialties, such as available under the trade designations "EBECRYL 8402", "EBECRYL 8807" and "EBECRYL 4827". Oligomeric urethane (meth)acrylates may also be prepared by the initial reaction of an alkylene or aromatic diisocyanate of the formula OCN-R3-NCO with a polyol. Most often, the polyol is a diol of the formula HO—R4-OH wherein R3 is a C2-100 alkylene or an arylene group and R4 is a C2-100 alkylene group. Alkylene and arylene groups may include ether or ester groups. The intermediate product is then a urethane diol diisocyanate, which subsequently can undergo reaction with a hydroxyalkyl (meth)acrylate. Suitable diisocyanates include 2,2,4-trimethylhexylene diisocyanate and toluene diisocyanate. Alkylene diisocyanates are generally preferred. A particularly preferred compound of this type may be prepared from hexane diisocyanate, poly(caprolactone)diol and 2-hydroxyethyl methacrylate. In at least some cases, the urethane (meth)acrylate is preferably aliphatic.

The polymerizable compositions can be mixtures of various monomers and or oligomers, having the same or differing reactive functional groups. Polymerizable compositions comprising two or more different functional groups may be used, including the following; (meth)acrylate, epoxy and urethane. The differing functionality may be contained in different monomeric and or oligomeric moieties or in the same monomeric and or oligomeric moiety. For example, a resin composition may comprise an acrylic or urethane resin having an epoxy group and or a hydroxyl group in the side chain, a compound having an amino group and, optionally, a silane compound having an epoxy group or amino group in the molecule.

The compositions are polymerizable using conventional techniques such as thermal cure, photocure (cure by actinic radiation) and or e-beam cure. In one embodiment, the composition is photopolymerized by exposing it to ultraviolet (UV) and or visible light. More generally, a photopolymerizable composition is typically cured using actinic radiation, such as UV radiation, e-beam radiation, visible radiation, or any combination thereof. The skilled practitioner can select a suitable radiation source and range of wavelengths for a particular application without undue experimentation.

Conventional curatives and/or catalysts may be used in the polymerizable compositions and are selected based on the functional group(s) in the composition. Multiple curatives and or catalysts may be required if multiple cure functionality is being used. Combining one or more cure techniques, such as thermal cure, photocure and e-beam cure, is within the scope of the present disclosure.

Furthermore, the polymerizable compositions can comprise at least one other monomer and or oligomer (that is, other than those described above, namely the monomeric or oligomeric (meth)acrylate and the oligomeric urethane (meth)acrylate). This other monomer may reduce viscosity and/or improve thermomechanical properties and/or increase refractive index. Monomers having these properties include acrylic monomers (that is, acrylate and methacrylate esters, acrylamides and methacrylamides), styrene monomers and ethylenically unsaturated nitrogen heterocycles.

Also included are (meth)acrylate esters having other functionality. Compounds of this type are illustrated by the 2-(N-butylcarbamyl)ethyl (meth)acrylates, 2,4-dichlorophenyl acrylate, 2,4,6-tribromophenyl acrylate, tribromophenoxylethyl acrylate, t-butylphenyl acrylate, phenyl acrylate, phenyl thioacrylate, phenylthioethyl acrylate, alkoxylated phenyl acrylate, isobornyl acrylate and phenoxyethyl acrylate. The reaction product of tetrabromobisphenol A diepoxide and (meth)acrylic acid is also suitable. The other monomers may also be a monomeric N-substituted or N,N-disubstituted (meth)acrylamide, especially an acrylamide. These include N-alkylacrylamides and N,N-dialkylacrylamides, especially those containing C1-4 alkyl groups. Examples are N-isopropylacrylamide, N-t-butylacrylamide, N,N-dimethylacrylamide and N,N-diethylacrylamide. The term "(meth)acrylamide" means acrylamide and methacrylamide.

Styrenic compounds suitable for use as the other monomer include styrene, dichlorostyrene, 2,4,6-trichlorostyrene, 2,4,6-tribromostyrene, 4-methylstyrene and 4-phenoxystyrene. Ethylenically unsaturated nitrogen heterocycles include N-vinylpyrrolidone and vinylpyridine.

Photopolymerizable compositions in accordance with the present disclosure typically include at least one photoinitiator. Suitable exemplary photoinitiators are those available under the trade designations OMNIRAD from IGM Resins (Waalwijk, The Netherlands) and include 1-hydroxycyclohexyl phenyl ketone (OMNIRAD 184), 2,2-dimethoxy-1,2-diphenylethan-1-one (OMNIRAD 651), bis(2,4,6 trimethylbenzoyl)phenylphosphine oxide (OMNIRAD 819), 1-[4-(2-hydroxyethoxy)phenyl]-2-hydroxy-2-methyl-1-propane-1-one (OMNIRAD 2959), 2-benzyl-2-dimethylamino-1-(4-morpholinophenyl)butanone (OMNIRAD 369), 2-Dimethylamino-2-(4-methyl-benzyl)-1-(4-morpholin-4-yl-phenyl)-butan-1-one (OMNIRAD 379), 2-methyl-1-[4-(methylthio)phenyl]-2-morpholinopropan-1-one (OMNIRAD 907), Oligo[2-hydroxy-2-methyl-1-[4-(1-methylvinyl) phenyl]propanone] ESACURE ONE (Lamberti S.p.A., Gallarate, Italy), 2-hydroxy-2-methyl-1-phenyl propan-1-one (DAROCUR 1173), 2, 4, 6-trimethylbenzoyldiphenylphosphine oxide (OMNIRAD TPO), and 2,4,6-trimethylbenzoylphenyl phosphinate (OMNIRAD TPO-L). Additional suitable photoinitiators include for example and without limitation, benzyl dimethyl ketal, 2-methyl-2-hydroxypropiophenone, benzoin methyl ether, benzoin isopropyl ether, anisoin methyl ether, aromatic sulfonyl chlorides, photoactive oximes, and combinations thereof.

In some embodiments, a cationic photoinitiator is present in compositions that include an epoxy component, for example. Further, a thermal initiator can also optionally be present in a photopolymerizable composition described herein. For instance, a free-radical photoinitiator, a cationic photoinitiator, a thermal photoinitiator, or any combination thereof may be present in a photopolymerizable composition.

Suitable cationic photoinitiators include for instance and without limitation, bis[4-diphenylsulfoniumphenyl]sulfide bishexafluoroantimonate; thiophenoxyphenylsulfonium hexafluoroantimonate (available as CHIVACURE 1176 from Chitec (Houston, TX)), tris(4-(4-acetylphenyl)thiophenyl)sulfonium tetrakis(pentafluorophenyl)borate, tris(4-(4-acetylphenyl)thiophenyl)sulfonium tris[(trifluoromethyl) sulfonyl]methide, tris(4-(4-acetylphenyl)thiophenyl) sulfonium hexafluorophosphate, [4-(1-methylethyl)phenyl] (4-methylphenyl) iodonium tetrakis(pentafluorophenyl) borate, 4-[4-(2-chlorobenzoyl)phenylthio]phenylbis(4-fluorophenyl)sulfonium hexafluoroantimonate, and aromatic sulfonium salts with anions of $(PF_{6-m}(C_nF_{2n+1})_m)$ where m is an integer from 1 to 5, and n is an integer from 1 to 4 (available as CPI-200K or CPI-200S, which are monovalent sulfonium salts from San-Apro Ltd., (Kyoto, JP), TK-1 available from San-Apro Ltd., or HS-1 available from San-Apro Ltd.)

In some embodiments, a photoinitiator is present in a photopolymerizable composition in an amount of up to about 5% by weight, based on the total weight of polymerizable components in the photopolymerizable composition (e.g., not including components such as particles). In some cases, a photoinitiator is present in an amount of about 0.1-5% by weight, 0.2-5% by weight, or 0.5-5% by weight, based on the total weight of the photopolymerizable composition.

In some embodiments, a thermal initiator is present in a polymerizable composition in an amount of up to about 5% by weight, such as about 0.1-5% by weight, based on the total weight of polymerizable components in the polymerizable composition. Suitable thermal initiators include for instance and without limitation, peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis (isobutyronitrile), and t-butyl perbenzoate. Examples of commercially available thermal initiators include initiators available from DuPont Specialty Chemical (Wilmington, DE) under the VAZO trade designation including VAZO 67 (2,2'-azo-bis(2-methybutyronitrile)), VAZO 64 (2,2'-azo-bis (isobutyronitrile)) and VAZO 52 (2,2'-azo-bis(2,2-dimethyvaleronitrile)), and LUCIDOL 70 from Elf Atochem North America, Philadelphia, PA.

When more than one initiator is used (e.g., photoinitiator(s) and/or thermal initiator(s)) in a polymerizable composition to form a layer, the resulting layer typically comprises some remaining amount of both a first initiator or initiator fragment and a second initiator or initiator fragment present in the layer.

Unexpectedly, in some embodiments, the attachment of the first layer and the second layer of the article is sufficiently strong to exhibit a peel force of 5 grams per centimeter (g/cm) or greater, 7 g/cm or greater, 10 g/cm or greater, 12 g/cm or greater, 15 g/cm or greater, 17 g/cm or greater, 20 g/cm or greater, 22 g/cm or greater, 25 g/cm or greater, 27 g/cm or greater, 30 g/cm or greater, 32 g/cm or greater, 35 g/cm or greater, 37 g/cm or greater, 40 g/cm or greater, 42 g/cm or greater, 45 g/cm or greater, 47 g/cm or greater, or even 50 g/cm or greater; and 100 g/cm or less, 90 g/cm or less, 80 g/cm or less, 70 g/cm or less, or 60 g/cm or less. In embodiments, at least one the first layer or the second layer themselves fail instead of the two layers separating from each other. By failure of a layer is meant that the layer splits, fractures, fragments, etc., as opposed to maintaining its structural integrity. The peel force (or layer failure) can be determined using the Peel Force test method described in the Examples below.

Figure 3A:
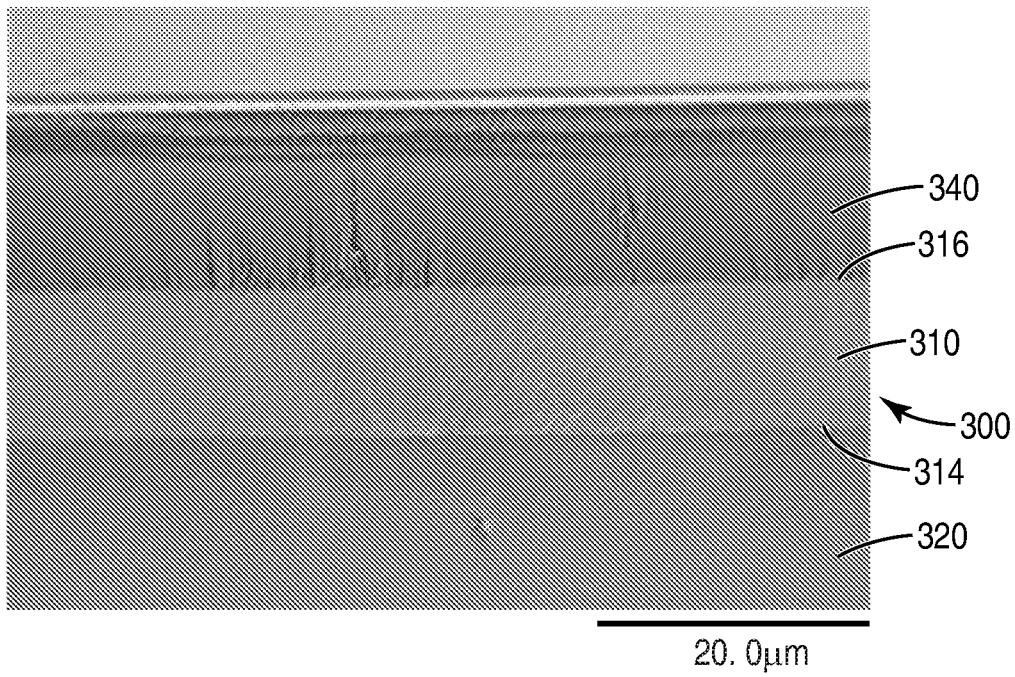
FIG. 3A is an SEM image of a cross-section of the first nanostructured area of the exemplary article of Example 2 at a magnification of 2,000×, according to the present application.
Figure 3B:
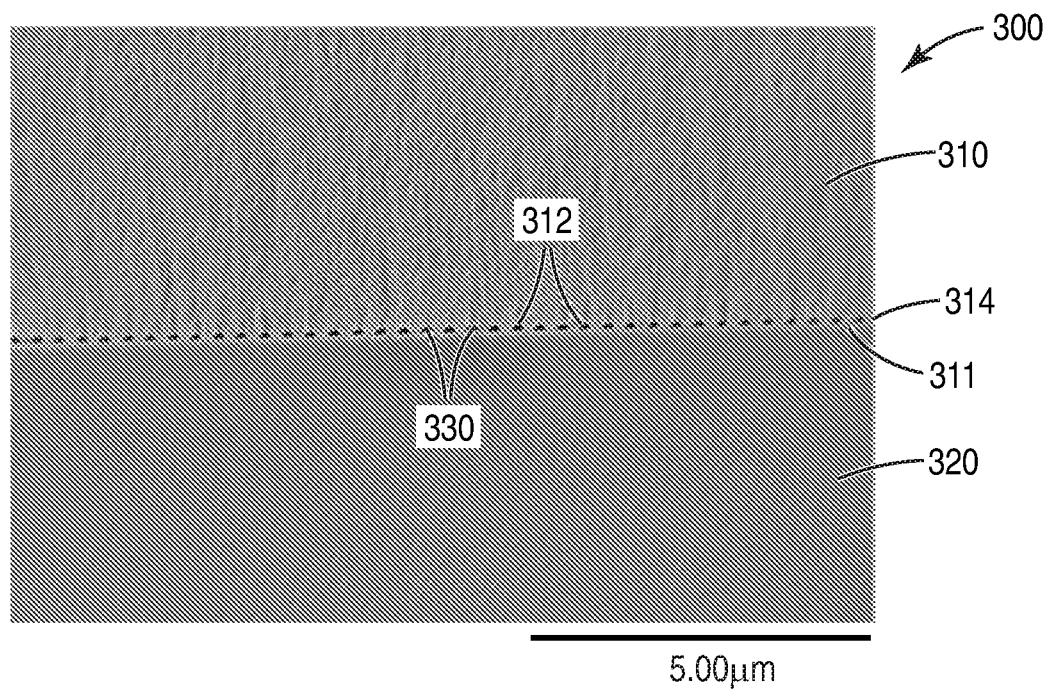
FIG. 3B is an SEM image of a cross-section of the exemplary article of FIG. 3A at a magnification of 10,000×.
Figure 3C:
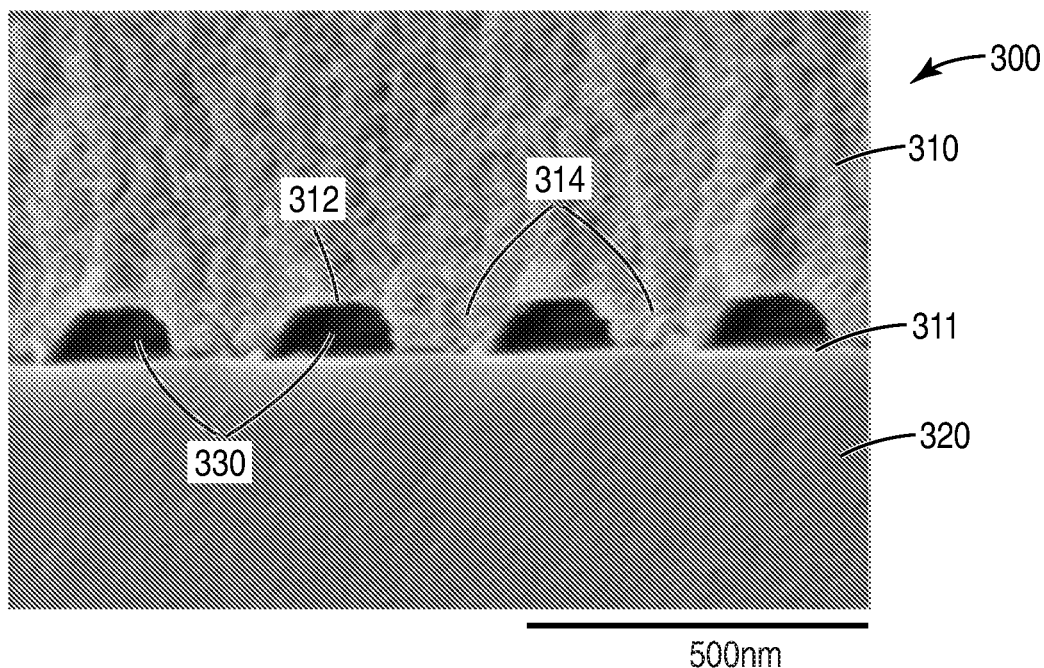
FIG. 3C is an SEM image of a cross-section of the exemplary article of FIG. 3A at a magnification of 100,000×.
Figure 3D:
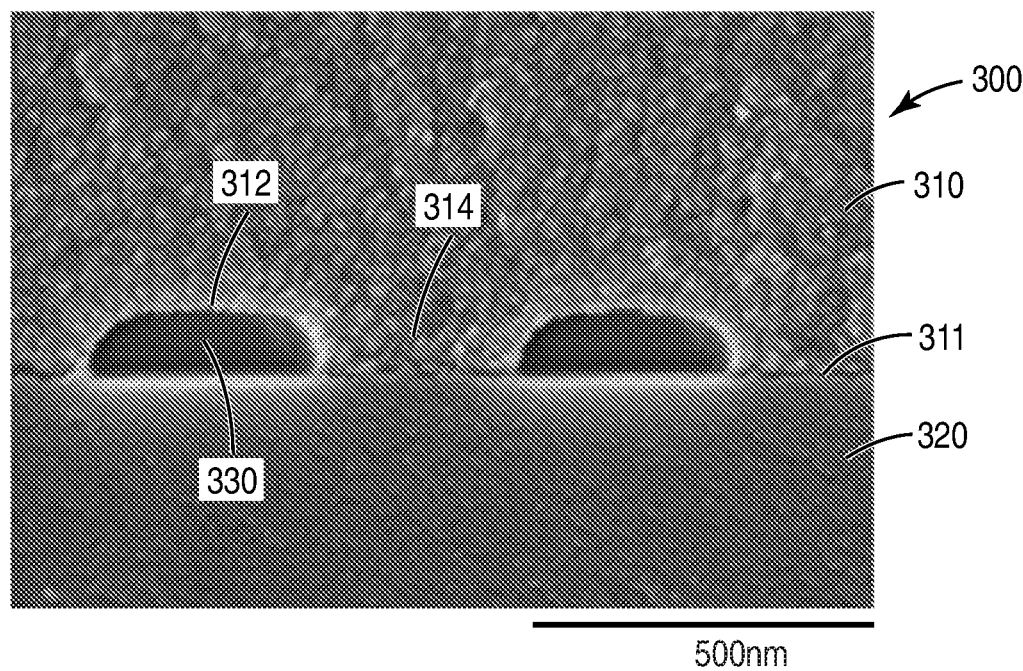
FIG. 3D is an SEM image of a cross-section of the second nanostructured area of the exemplary article of Example 2 at a magnification of 100,000×.

In a second aspect, an optical element is provided. The optical element includes an article according to the first aspect described in detail above. For example, referring to FIGS. 3A-3D, SEM images are provided of cross-sections of portions of the exemplary article of Example 2 (described below in detail). FIG. 3A has a magnification of 2,000× and shows an article 300 comprising a first layer 310 comprising a nanostructured first surface comprising a plurality of nanofeatures 314, and a second layer 320 comprising glass and attached to a portion of the nanofeatures 114 of the nanostructured first surface. This article 300 further comprises a third layer 340 attached to an opposing second surface 316 of the first layer 310. The third layer 340 comprises a copolyester layer having a thickness of about 10 micrometers. Referring to FIG. 3B (i.e., magnification of 10,000×), the first layer 310, a nanostructured first surface 312 comprising nanofeatures 314, a second layer 320, and a coupling agent layer 311 (in FIGS. 3B-3D) attached to a portion of the nanofeatures 314 are all shown. In the embodiment of FIG. 3B, one connected void 330 is present that surrounds many, most, or all of the (e.g., protruding) nanofeatures 314. Referring to FIGS. 3C and 3D (i.e., magnification of 100,000×), the shapes of some of the nanofeatures 314 of two separated nanostructured areas of the article (see, e.g., FIG. 4A) are seen more clearly.

Figure 4A:
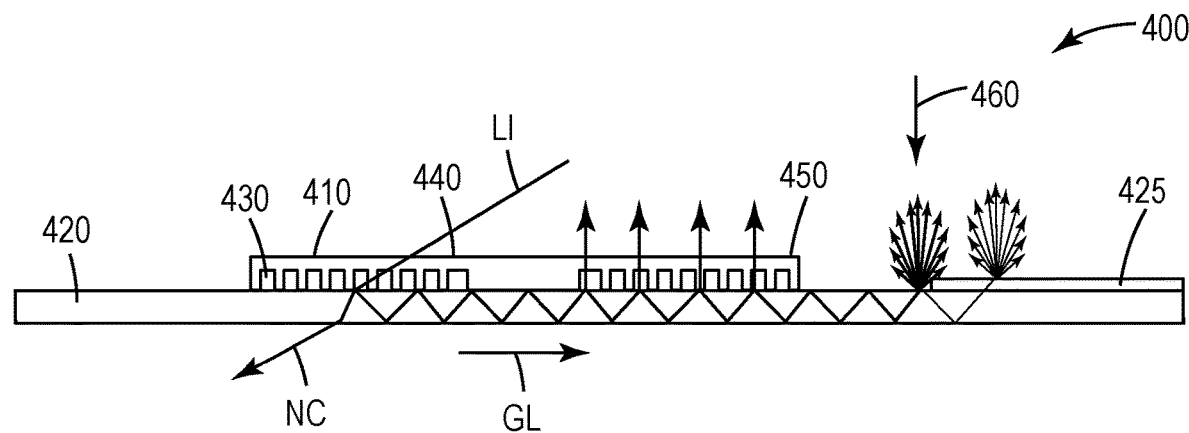
FIG. 4A is schematic cross-sectional view of the exemplary article according to Example 2.

Referring to FIG. 4A, a schematic diagram of a cross-section is provided of an exemplary article 400, e.g., of Example 2, in which layer 410 is a first layer comprising a nanostructured surface that is bonded to a second layer 420 comprising glass, including a plurality of enclosed voids 430. A light input LI directed at the first layer 410 enters the article 400 at a location of an input grating 440. A portion of the light exits the article 400 through the second layer 420 as not coupled light NC. A portion of the light propagates through the glass of the second layer 420 as guided light in the direction of the arrow GL. After passing a planar region of the first layer 410 that lacks enclosed voids 430, some of the propagated light exits the article 400 at an output grating 450, for instance at four output spots (e.g., indicated by the arrows pointing away from the article 400). Propagated light may exit the article at various angles (e.g., not necessarily normal to the article as illustrated by the four arrows in FIG. 4A). Factors that can affect the exit angle include for instance, an input coupling angle, a pitch of the nanofeatures of the input grating, and an index of refraction difference between the glass and the input grating. The remainder of the propagated light exits the article 400 through a frosted area 425 of the second layer 420 as scattered light 460. This article 400 may be useful in augmented reality waveguide applications. In an embodiment, the optical element comprises a diffraction grating.

Figure 4B:
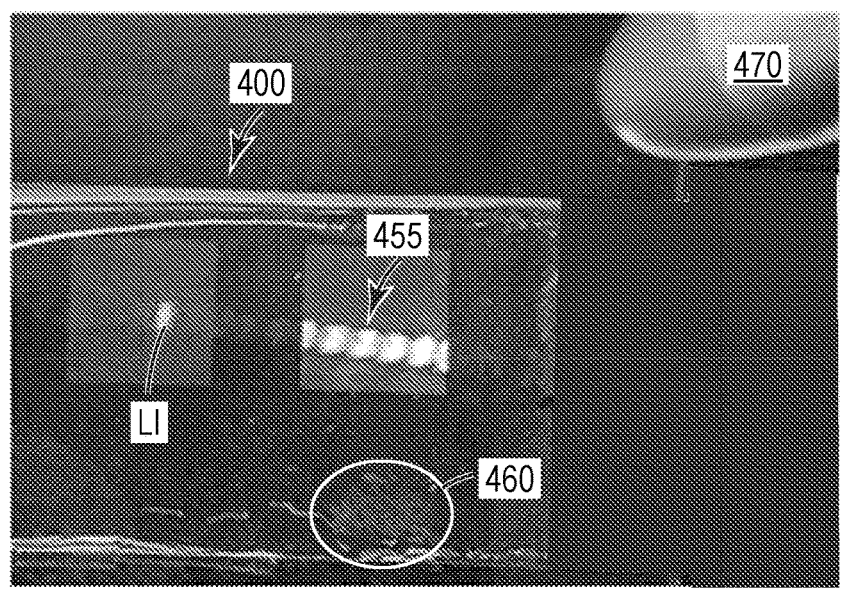
FIG. 4B is a photograph of the exemplary article of Example 2 in use.

FIG. 4B is a photograph of the article of Example 2 in use. More particularly, FIG. 4B shows a laser pointer 470 directing laser light at the article 400 of FIG. 4A at a location of light input LI (e.g., at an input grating). Following propagation through the article 400, as guided light, some of the propagated light 455 exits the article 400 (e.g., at an output grating), for instance providing a plurality of overlapping light spots. Further, some propagated light exits the article 400 (e.g., through a frosted area of the second layer) as scattered light 460.

Methods

Various methods may be employed according to the present disclosure to prepare the article according to the first aspect described above. More particularly, in a third aspect, a method of making an article is provided. The method comprises:

a) obtaining a first layer comprising a nanostructured first surface comprising nanofeatures and an opposing second surface, wherein the nanostructured first surface comprises recessed features, or protruding features formed of a single composition, or both recessed and protruding features;

b) treating a first major surface of a second layer with a coupling agent to bond the coupling agent with the second layer, wherein the first major surface of the second layer comprises an inorganic material;

c) contacting the treated first major surface of the second layer with a portion of the nanostructured first surface of the first layer; and d) bonding at least one of the first layer or the coupling agent bonded with the second layer to bond the first layer and the second layer together through a bonded coupling agent, wherein the bonded coupling agent directly bonds the first major surface of the second layer to the nanostructured first surface of the first layer or is present as a coupling agent layer, wherein the nanostructured first surface of the first layer and either the first major surface of the second layer or the coupling agent layer together define at least one void.

Figure 5:
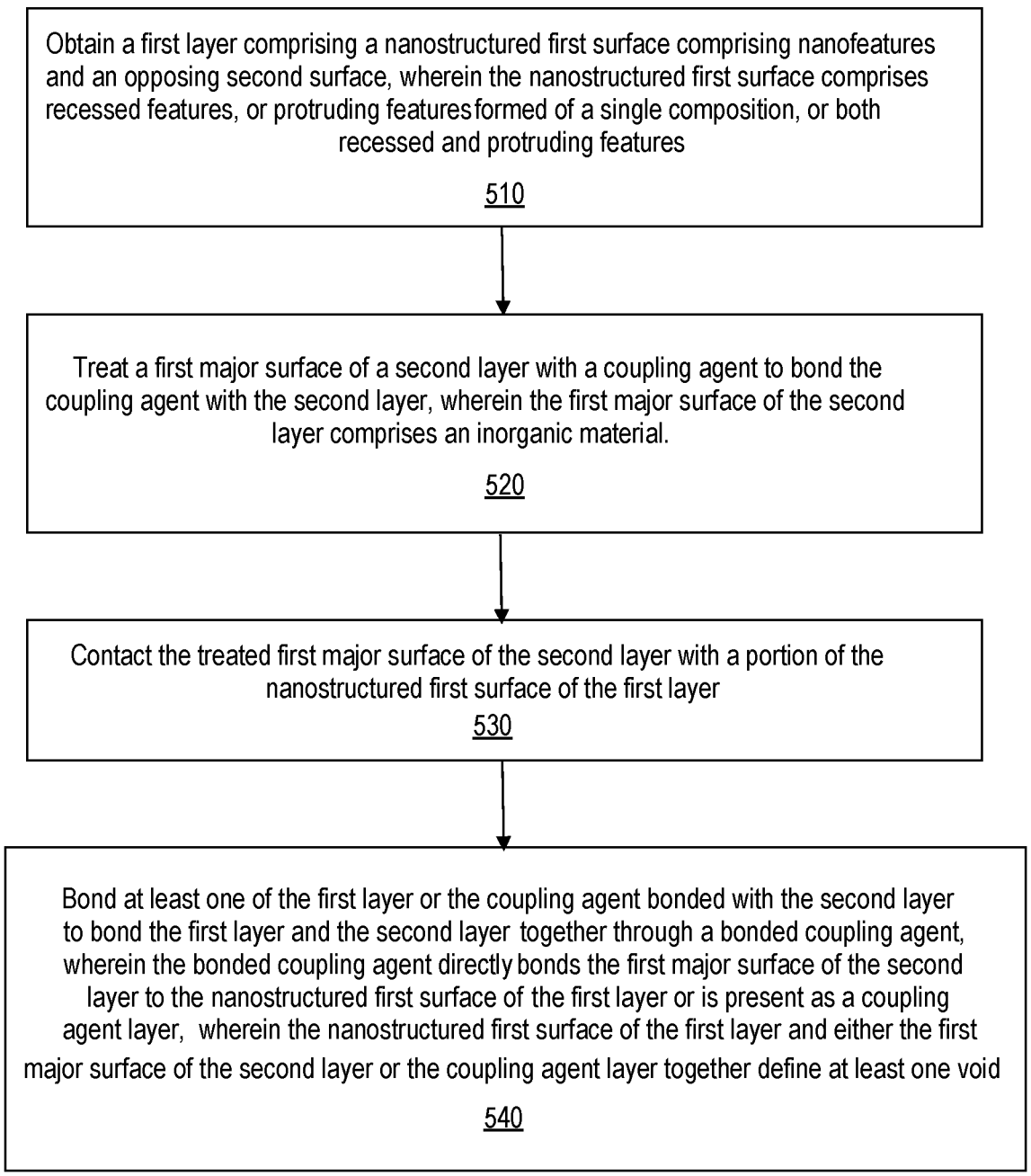
FIG. 5 is a flow chart of an exemplary method of making an article, according to the present application.

FIG. 5 is a flow chart of an exemplary method of making an article, according to the present application. Referring to FIG. 5, a method for making an article includes a Step 510 to obtain a first layer comprising a nanostructured first surface comprising nanofeatures and an opposing second surface, wherein the nanostructured first surface comprises recessed features, or protruding features formed of a single composition, or both recessed and protruding features. Next, the method includes a Step 520 to treat a first major surface of a second layer with a coupling agent to bond the coupling agent with the second layer, wherein the first major surface of the second layer comprises an inorganic material. In any embodiment, the treating (e.g., functionalizing) may comprise applying a coating of a coupling agent composition on the first major surface of the second layer and drying the composition. Such a coupling agent composition typically comprises the coupling agent and a solvent. In certain embodiments, the coupling agent composition further comprises at least one of a photoinitiator or a thermal initiator. In some embodiments, the method further comprises washing the treated first major surface of the second layer to remove unbound (e.g., unreacted) coupling agent.

The method next includes a Step 530 to contact the treated first major surface of the second layer with a portion of the nanostructured first surface of the first layer. In any embodiment, the first layer is contacted with the second layer by laminating the first layer and the second layer together. Lamination of layers is well known, and often involves processes such as subjecting at least one outer major surface of a stack of the layers to a weighted roller or passing stacked layers through a nip roller line or benchtop laminator.

In embodiments including any additional layer (e.g., a third layer, a fourth layer, etc.) attached to a major surface of the first layer or the second layer, the additional layer(s) is preferably attached to one of the first layer or the second layer prior to contacting the first layer with the second layer. For instance, an opposing second surface of the first layer can be attached to a substrate (e.g., a layer) and/or the second layer can have a second major surface that is attached to a substrate (e.g., a layer).

The method further includes a Step 540 to bond at least one of the first layer or the coupling agent to bond (covalently or non-covalently) the first layer and the second layer together through the bonded coupling agent, wherein the bonded coupling agent directly bonds the first major surface of the second layer to the nanostructured first surface of the first layer or is present as a coupling agent layer, wherein the nanostructured first surface of the first layer and the first major surface of the second layer together define at least one void. In any embodiment, the bonding (e.g., reacting) of Step 540 may comprise subjecting the first layer and/or the coupling agent bonded with the second layer to actinic radiation. Suitable forms of actinic radiation comprise ultraviolet (UV) light, visible light, e-beam, gamma, or any combination thereof. Alternatively, or in addition, the first layer and/or the coupling agent and the second layer is bonded by subjecting the first layer and/or the second layer to heat. An advantage of bonding one or more of the first layer or the coupling agent with the second layer is that the bond usually creates a stronger connection between the first layer and the second layer than achieved solely by applying physical pressure (e.g., lamination) to the outer major surfaces of the first layer and the second layer, particularly since the major surface of the second layer is typically only in contact with a portion of the nanostructured first surface instead of in contact with an entire major surface of the first layer, particularly when the nanofeatures are protruding nanofeatures. For example, reacting a crosslinkable material may generate crosslinks between the first layer and the second layer, via the bonded coupling agent. In some embodiments, at least one of the first layer or the coupling agent bonded with the second layer comprises a partially cured material and the partially cured material is reacted to secure the first layer and the second layer together, e.g., covalently bonding the two layers together. Optionally, the first layer comprises a photoinitiator, a thermal initiator, or both.

SELECT EMBODIMENTS OF THE DISCLOSURE

In a first embodiment, the present disclosure provides an article. The article comprises a) a first layer comprising a nanostructured first surface comprising nanofeatures and an opposing second surface; and b) a second layer comprising a first major surface and an opposing second major surface, the first major surface bonded to a portion of the nanostructured first surface of the first layer. The nanostructured first surface comprises recessed features, or protruding features formed of a single composition, or both recessed and protruding features. The second layer comprises an inorganic material. The article comprises at least one enclosed void defined in part by the nanostructured first surface of the first layer.

In a second embodiment, the present disclosure provides an article according to the first embodiment, wherein the first major surface of the second layer is bonded to a portion of the nanostructured surface of the first layer via a bonded coupling agent.

In a third embodiment, the present disclosure provides an article according to the second embodiment, wherein the bonded coupling agent is present as a portion of a coupling agent layer having a thickness of less than 100 nanometers (nm), less than 50 nm, or less than 25 nm.

In a fourth embodiment, the present disclosure provides an article according to the third embodiment, wherein the at least one enclosed void is defined by the nanostructured first surface of the first layer and a first major surface of the coupling agent layer.

In a fifth embodiment, the present disclosure provides an article according to the second embodiment or the third embodiment, wherein the bonded coupling agent directly bonds the first major surface of the second layer to the nanostructured first surface of the first layer.

In a sixth embodiment, the present disclosure provides an article according to any of the first, second, or fifth embodiments, wherein the at least one enclosed void is defined by the nanostructured first surface of the first layer and the first major surface of the second layer.

In a seventh embodiment, the present disclosure provides an article according to any of the first through sixth embodiments, wherein the inorganic material comprises an oxide, a nitride, a carbide, or a boride of a metal or a nonmetal, or combinations thereof.

In an eighth embodiment, the present disclosure provides an article according to any of the first through seventh embodiments, wherein the inorganic material comprises an oxide of titanium, indium, tin, tantalum, zirconium, niobium, aluminum, silicon, or combinations thereof.

In a ninth embodiment, the present disclosure provides an article according to any of the first through eighth embodiments, wherein the inorganic material comprises glass.

In a tenth embodiment, the present disclosure provides an article according to any of the first through ninth embodiments, wherein the inorganic material is in the form of a self-supporting layer.

In an eleventh embodiment, the present disclosure provides an article according to any of the first through ninth embodiments, wherein the inorganic material is in the form of a coating or layer that is not self-supporting, and wherein the second layer comprises the inorganic material supported on a polymeric material.

In a twelfth embodiment, the present disclosure provides an article according to any of the first through eleventh embodiments, wherein the second layer is substantially planar.

In a thirteenth embodiment, the present disclosure provides an article according to any of the first through twelfth embodiments, wherein the at least one enclosed void contains a gas.

In a fourteenth embodiment, the present disclosure provides an article according to any of the first through thirteenth embodiments, wherein the first layer is an organic layer.

In a fifteenth embodiment, the present disclosure provides an article according to any of the first through fourteenth embodiments, wherein the first layer comprises a polymeric material.

In a sixteenth embodiment, the present disclosure provides an article according to any of the first through fifteenth embodiments, wherein the first layer comprises a crosslinked material or a crosslinkable material.

In a seventeenth embodiment, the present disclosure provides an article according to any of the first through sixteenth embodiments, wherein the first layer comprises an acrylic polymer or copolymer.

In an eighteenth embodiment, the present disclosure provides an article according to any of the first through seventeenth embodiments, wherein the bonded coupling agent comprises at least one of silicon, phosphorous, titanium, or zirconium.

In a nineteenth embodiment, the present disclosure provides an article according to any of the first through seventeenth embodiments, wherein the bonded coupling agent comprises at least one functional group selected from an acrylate, a urethane, a urea, an alkylene, a ureido, an isocyanate, an epoxy, an alcohol, an amine, a thiol, a phenol, an amino, an acid, a heteroatom, and at least one of silicon, phosphorous, titanium, or zirconium.

In a twentieth embodiment, the present disclosure provides an article according to any of the first through nineteenth embodiments, wherein the height of the nanofeatures is less than a micrometer and at least 10 nanometers.

In a twenty-first embodiment, the present disclosure provides an article according to any of the first through twentieth embodiments, wherein the width of the nanofeatures is less than a micrometer and at least 10 nanometers.

In a twenty-second embodiment, the present disclosure provides an article according to any of the first through twenty-first embodiments, wherein the nanofeatures include at least one non-linear surface in at least one direction.

In a twenty-third embodiment, the present disclosure provides an article according to any of the first through twenty-second embodiments, wherein the nanostructured first surface includes recessed features.

In a twenty-fourth embodiment, the present disclosure provides an article according to any of the first through twenty-third embodiments, wherein the nanostructured first surface includes only recessed features.

In a twenty-fifth embodiment, the present disclosure provides an article according to any of the first through twenty-third embodiments, wherein the nanostructured first surface includes protruding features.

In a twenty-sixth embodiment, the present disclosure provides an article according to any of the first through twenty-second or twenty-fifth embodiments, wherein the nanostructured first surface includes only protruding features.

In a twenty-seventh embodiment, the present disclosure provides an article according to any of the first through twenty-sixth embodiments, exhibiting a peel force of 5 grams per centimeter (g/cm) or greater, 10 g/cm or greater, 20 g/cm or greater, 30 g/cm or greater, or 50 g/cm or greater, or exhibits failure of the first layer or the second layer, as determined by the Peel Force test.

In a twenty-eighth embodiment, the present disclosure provides an article according to any of the first through twenty-seventh embodiments, wherein the second layer has an average thickness of greater than 1 nanometers, 10 nanometers, 50 nanometers, 100 nanometers, 500 nanometers, 1 micrometer, 2 micrometers, or 3 micrometers.

In a twenty-ninth embodiment, the present disclosure provides an article according to any of the first through twenty-eighth embodiments, further including a third layer attached to the opposing second surface of the first layer.

In a thirtieth embodiment, the present disclosure provides an article according to the twenty-ninth embodiment, wherein the third layer includes a polymeric layer.

In a thirty-first embodiment, the present disclosure provides an article according to the twenty-ninth embodiment or the thirtieth embodiment, wherein the third layer includes a low-birefringent layer.

In a thirty-second embodiment, the present disclosure provides an article according to any of the first through thirty-first embodiments, further including a fourth layer attached to a second major surface of the second layer.

In a thirty-third embodiment, the present disclosure provides an article according to the thirty-second embodiment, wherein the fourth layer includes a polymeric layer.

In a thirty-fourth embodiment, the present disclosure provides an article according to the thirty-second embodiment or the thirty-third embodiment, wherein the fourth layer includes a low-birefringent layer.

In a thirty-fifth embodiment, the present disclosure provides an article according to any of the first through thirty-fourth embodiments, wherein the second layer is nonporous.

In a thirty-sixth embodiment, the present disclosure provides an article according to any of the first through thirty-fifth embodiments, wherein the first layer further includes a first initiator or initiator fragment and a second initiator or initiator fragment.

In a thirty-seventh embodiment, the present disclosure provides an article according to any of the first through seventeenth embodiments or twentieth through thirty-sixth embodiments, wherein the first major surface of the second layer is covalently bonded to a portion of the nanostructured first surface of the first layer via the bonded coupling agent.

In a thirty-eighth embodiment, the present disclosure provides an optical element including an article according to any of the first through thirty-seventh embodiments.

In a thirty-ninth embodiment, the present disclosure provides a method of making an article. The method comprises: a) obtaining a first layer comprising a nanostructured first surface comprising nanofeatures and an opposing second surface; b) treating a first major surface of a second layer with a coupling agent to bond the coupling agent with the second layer, wherein the first major surface of the second layer comprises an inorganic material; c) contacting the treated first major surface of the second layer with a portion of the nanostructured first surface of the first layer; and d) bonding at least one of the first layer or the coupling agent bonded with the second layer to bond the first layer and the second layer together through a bonded coupling agent, wherein the bonded coupling agent directly bonds the first major surface of the second layer to the nanostructured first surface of the first layer or is present as a portion of a coupling agent layer. The nanostructured first surface comprises recessed features, or protruding features formed of a single composition, or both recessed and protruding features. The nanostructured first surface of the first layer and either the first major surface of the second layer or the coupling agent layer together define at least one void.

In a fortieth embodiment, the present disclosure provides a method according to the thirty-ninth embodiment, wherein the bonding comprises subjecting the first layer, the coupling agent bonded with the second layer, or both, to actinic radiation.

In a forty-first embodiment, the present disclosure provides a method according to the fortieth embodiment, wherein the actinic radiation comprises ultraviolet (UV) light, visible light, e-beam, gamma, or a combination thereof.

In a forty-second embodiment, the present disclosure provides a method according to any of the thirty-ninth through forty-first embodiments, wherein the bonding comprises subjecting the first layer, the coupling agent bonded with the second layer, or both, to heat.

In a forty-third embodiment, the present disclosure provides a method according to any of the thirty-ninth through forty-second embodiments, wherein the first layer, the coupling agent bonded with the second layer, or both, comprises a partially cured material and the partially cured material is reacted to covalently bond the first layer and the second layer together.

In a forty-fourth embodiment, the present disclosure provides a method according to any of the thirty-ninth through forty-third embodiments, wherein the first layer comprises a photoinitiator, a thermal initiator, or both.

In a forty-fifth embodiment, the present disclosure provides a method according to any of the thirty-ninth through forty-fourth embodiments, wherein the opposing second surface of the first layer is attached to a substrate.

In a forty-sixth embodiment, the present disclosure provides a method according to any of the thirty-ninth through forty-fifth embodiments, wherein the second layer comprises a second major surface that is attached to a substrate.

In a forty-seventh embodiment, the present disclosure provides a method according to any of the thirty-ninth through forty-sixth embodiments, wherein the contacting comprises laminating the second layer and the first layer together.

In a forty-eighth embodiment, the present disclosure provides a method according to any of the thirty-ninth through forty-seventh embodiments, wherein the treating comprises applying a coating of a coupling agent composition on the first major surface of the second layer and drying the composition.

In a forty-ninth embodiment, the present disclosure provides a method according to the forty-eighth embodiment, wherein the coupling agent composition comprises the coupling agent, a solvent, and at least one of a photoinitiator or a thermal initiator.

In a fiftieth embodiment, the present disclosure provides a method according to any of the thirty-ninth through forty-ninth embodiments, further comprising washing the treated first major surface of the second layer to remove unbound coupling agent.

Examples

Advantages and embodiments of this invention are further illustrated by the following examples, but the particular materials and amounts thereof recited in these examples, as well as other conditions and details, should not be construed to unduly limit this invention. Unless otherwise noted or readily apparent from the context, all parts, percentages, ratios, etc. in the Examples and the rest of the specification are by weight.

Materials Used in the Examples

| Description | Component | Source |
|---|---|---|
| Ethoxylated (4) bisphenol A diacrylate | SR601 | Sartomer Americas, Exton, PA |
| Ethoxylated (10) bisphenol A diacrylate | SR602 | Sartomer Americas |
| Trimethylolpropane triacrylate | SR351 | Sartomer Americas |
| 1,6-Hexanediol diacrylate | SR238 | Sartomer Americas |
| Ethoxylated trimethylolpropane triacrylate | SR454 | Sartomer Americas |
| Urethane acrylate oligomer | PHOTOMER 6210 | IGM Resins, Charlotte, NC |
| 2-Phenoxyethyl acrylate | ETERMER 210 | Toagosei America Inc., West Jefferson, OH |
| 4,4'-Methylenebis(cyclohexyl isocyanate) | HMDI | Covestro LLC, Pittsburgh, PA |
| Polyether glycol | TERETHANE 1000 | Invista, Wichita, KS |
| Dibutyultin dilaureate | SKU 291234 | Sigma-Aldrich Corporation, St. Louis, MO |
| 2-hydroxyethylacrylate | HEA | Kowa American Corporation, New York, NY |
| Butylated hydroxytoluene | BHT | Oxiris Chemicals S.A., Barcelona, Spain |
| Methoxy hydroquinone | MEHQ | Solvay USA Inc., Cranbury, NJ |
| Antioxidant | IRGANOX 1035 | BASF, Florham Park, NJ |
| Diphenyl(2,4,6-trimethylbenzoyl)phosphine oxide | IRGACURE TPO | BASF |
| 2-Hydroxy-2-methyl-1-phenyl-propanone | DAROCUR 1173 | BASF |
| Linear triblock copolymer | KRATON G1645 | Kraton Corporation, Houston, TX |
| Polypropylene | PP9074MED | ExxonMobil Corporation, Irving TX |
| Copolyester | EASTAR GN071 | Eastman Chemical Company, Kingsport, TN |
| 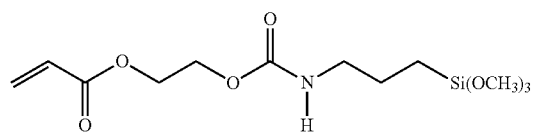 | K90 | Preparative Example 7 of U.S. Pat. No. 9,790,396 |

Test Methods

Peel Force Test

Peel force was evaluated by performing a 180-degree peel test using a Slip/Peel Tester (obtained under the trade designation "IMASS SP-2100" from iMass, Inc, Accord, MA). A test sample was mounted to the platen of the SP-2100 by attaching the glass slide side of the laminate to the platen with 1 inch (2.54 cm) wide 3M REMOVABLE REPOSITIONABLE TAPE 665. The laminate was separated at the film/glass interface and the film was attached to the iMass load cell. The platen was advanced at 0.508 centimeters per second (cm/s) and the force was recorded for 10 seconds. The average peel force over that time was reported.

SEM Imaging

The outer three layers of the multilayer film of a film/glass laminate test sample were removed. The resulting construction was cross-sectioned by holding the sample with pliers and fracturing the laminate with a small brass hammer shortly after submerging the sample in liquid nitrogen. This procedure was performed so that areas of the polymer layers would fracture with minimal deformation. The cross-section was metalized (<2 nm thickness AuPd alloy) and imaged in a Hitachi 4700 Field-Emission Scanning Electron Microscope under conditions observed to have no effect on the sample.

Preparatory Examples

A polyurethane acrylate mixture was prepared by first adding 540 g HMDI to 1000 g TERETHANE 1000 with 0.38 g dibutyultin dilaureate as a catalyst. This isocyanate-terminated prepolymer was further reacted with 239.4 g HEA in the presence of 1.4 g BHT and 0.1 g MEHQ. The reaction was considered complete when an isocyanate peak was no longer present at around 2275 cm$^{-1}$ by Fourier-transform infrared spectroscopy. The resulting polyurethane acrylate was then diluted with 1021 g of SR454.

Unless noted otherwise, after all components were added the resin compositions were blended by warming to approximately 50 degrees C. and mixing for 12 hours on a roller mixer. Mixtures were blended until they appeared homogeneous.

Polyurethane acrylate mixture, SR602, SR601, SR351, and ETERMER 210 were combined and mixed in weight ratios of 60/20/4/8/8 respectively to produce Resin A.

Resin B was prepared by adding and mixing IRGACURE TPO, DAROCUR 1173 and IRGANOX 1035 in respective weight ratios of 0.35/0.1/0.2 parts per 100 parts of Resin A.

Resin C was prepared by combining and mixing PHOTOMER 6210, SR238, SR351, and IRGACUR TPO in weight ratios of 60/20/20/0.5.

Resin D was prepared as the inventive examples of U.S. Pat. No. 9,360,591 using carboxylic acid nanoparticle surface modifiers like those described in U.S. Pat. No. 8,530,572. The resulting Resin D had a refractive index of 1.67 at a wavelength of 633 nm.

Mixture A was prepared by mixing K90, DAROCURE 1173 and 2-propanol in weight ratios of 0.1/0.002/100, respectively.

Film A was prepared by first preparing a multilayer film using the method described in WO 2019/032635 A1 (Johnson et al.). The resulting multilayer film had a 43 micrometer polyethylene terephthalate (PET) layer, a 6-7 micron linear triblock copolymer layer ("KRATON G1645"), a 6-7 micrometer layer comprising a blend of 60 parts by weight polypropylene ("PP9074MED") and 40 parts by weight triblock copolymer ("KRATON G1645"), and a 15 micrometer copolyester layer ("EASTAR GN071"). Resin B was die coated from a heated storage container, through a heated hose and a heated die all set to 65.5° C. onto the copolyester surface of the multilayer film. The coated side of the film was pressed against a nanostructured nickel surface attached to a steel roller controlled at 71° C. using a rubber-covered roller at a speed of 7.6 meters per minute (m/min). The coating thickness of Resin B on the film was sufficient to fully wet the nickel surface and form a rolling bead of resin as the coated film was pressed against the nanostructured nickel surface. The resin-coated film was exposed to radiation from a Phoseon UV LED curing system (obtained under the trade designation "FIREJET FJ 300X20AC405-12W", from Phoseon Technologies, Hillsboro, OR) operating at 100% power while in contact with the nanostructured nickel surface. Nanostructured Film A was peeled from the nanostructured nickel surface.

Film B was prepared by first die coating Resin C at room temperature onto the multilayer film used to make Film A. The coated film was pressed against a nanostructured nickel surface attached to a steel roller controlled at 60° C. using a rubber covered roller at a speed of 15.2 m/min. The nanostructured nickel surface had two areas of linear nanostructured features where the first nanostructured area had a nominal pitch between features of 400 nanometers and the second nanostructured area had a nominal pitch between features of 600 nanometers. The coating thickness of Resin C on the film was sufficient to fully wet the nickel surface and form a rolling bead of resin as the coated film was pressed against a nanostructured nickel surface that had two areas of linear nanostructure. The film was exposed to radiation from two Fusion UV lamp systems (obtained under the trade designation "F600" from Fusion UV Systems, Gaithersburg, MD) fitted with D bulbs both operating at 142 W/cm while in contact with the nanostructured nickel surface. After peeling the film from the nanostructured nickel surface, the nanostructured side of the film was exposed again to radiation from a Fusion UV lamp system operating at 142 W/cm.

A silicon containing release layer according to methods described in U.S. Pat. No. 6,696,157 (David et al.) and U.S. Pat. No. 8,664,323 (Iyer et al.) and U.S. Patent Publication No. 2013/0229378 (Iyer et al.) was applied to the nanostructured film in a parallel plate capacitively coupled plasma reactor. The chamber has a central cylindrical powered electrode with a surface area of 1.7 m$^2$ (18.3 ft$^2$). After placing the nanostructured film on the powered electrode, the reactor chamber was pumped down to a base pressure of less than 1.3 Pa (2 mTorr). O$_2$ gas was flowed into the chamber at a rate of 1000 SCCM. Treatment was carried out using a plasma enhanced CVD method by coupling RF power into the reactor at a frequency of 13.56 MHz and an applied power of 2000 watts. Treatment time was controlled by moving the nanostructured film through the reaction zone at rate of 9.1 meter/min (30 ft/min) resulting in an approximate exposure time of 10 seconds. After completing the deposition, RF power was turned off and gasses were evacuated from the reactor. Following the 1st treatment, a 2nd plasma treatment was carried out in the same reactor without returning the chamber to atmospheric pressure. HMDSO gas was flowed into the chamber at approximately 1750 SCCM to achieve a pressure of 9 mTorr. 13.56 MHz RF power was subsequently coupled into the reactor with an applied power of 1000 W. The film was then carried through the reaction zone at a rate of 9.1 meter/min (30 ft/min) resulting in an approximate exposure time of 10 seconds. At the end of this treatment time, the RF power and the gas supply were stopped, and the chamber was returned to atmospheric pressure and the resulting Film B was removed from the chamber.

Film C was prepared by using the method described in WO 2019/032635 A1 (Johnson et al.). The resulting multilayer film had a 43 micrometer polyethylene terephthalate (PET) layer, a 6-7 micron linear triblock copolymer layer ("KRATON G1645"), a 6-7 micrometer layer comprising a blend of 70 parts by weight polypropylene ("PP9074MED") and 30 parts by weight triblock copolymer ("KRATON G1645"), and a 10 micrometer copolyester layer ("EASTAR GN071").

Glass microscope slides (obtained under the trade designation Premium Microscope Slides, Cat. No. 12-544-2, from Fisher Scientific, Pittsburgh, PA) were cleaned by placing the slides in an ozone cleaner (obtained under the trade designation UVO Cleaner Model 144AX from Jelight Company, Irvine, CA) for 5 minutes. Mixture A was applied to the glass slides by placing a couple of drops of Mixture A along the leading edge of each slide. A #7 wire wound coating rod (obtained under the trade designation RDS07 from RD Specialties, Inc., Webster NY) was used to spread Mixture A over the slide. Mixture A was then allowed to dry at ambient conditions for approximately one minute. The coated glass slides were placed into an oven set at 76° C. for 60 minutes.

Example 1

Film A was laminated to the coated side of coated glass slides using a hand ink roller. The laminate constructions were then exposed to radiation from a UV lamp system (obtained under the trade designation "F600" from Fusion UV Systems, Gaithersburg, MD) fitted with D bulb operating at 236 watt per centimeter (W/cm) at a speed of 25 feet per minute (ft/min) (7.62 meters/minute).

Three laminates were tested according to the Peel Force Test described above and the average peel force of the three laminates was 23 grams per centimeter (g/cm).

One laminate was analyzed using the SEM Imaging described above and the resulting images are shown in FIGS. 2A-2C.

Example 2

Film B was adhered to a 1.6 mm thick aluminum plate with the nanostructured side up, then a piece of Film C was placed over Film B with the copolyester side down and adhered along its leading edge using tape to Film B. A bead of Resin D was placed along the leading edge of the construction between the two films. A hand roller was used to press the two films together and spread Resin D between the two films. The laminated construction was place into an oven set at 60° C. for 1 minute. The aluminum plate, Film B, Resin D and Film C construction was then exposed to radiation from a Phoseon UV LED curing system ("FIRE-JET FJ 300X20AC405-12W") operating at 10% power at a speed of 30.5 m/min. The Film C and cured Resin D construction was removed from Film B. The nanostructured Resin D surface of the Film C and Resin D construction was pressed onto the coated side of a glass slide. The Film C, Resin D, and glass slide construction was passed under the UV light from a Fusion UV lamp system ("F600") fitted with a "D" bulb operating at 236 W/cm at a speed of 25 feet per minute (ft/min) (7.62 meters/minute) with the Film C side toward the UV lamp system.

Example 2 was prepared by removing the polyethylene terephthalate, the linear triblock copolymer layer, and the layer comprising a blend of the polypropylene and triblock copolymer from the Film C side of the Film C, Resin D, and glass slide construction. The first nanostructured area of Example 2 was illuminated with a red laser pointer as shown in FIGS. 4A-4B. Some of the light from the laser pointer coupled into Example 2 through the first nanostructured area, propagated in Example 2 and some of the propagating light was extracted in the second nanostructured area. The first and second nanostructured areas of Example 2 were analyzed using the SEM Imaging described above and the resulting images are shown in FIGS. 3A-3D.

All of the patents and patent applications mentioned above are hereby expressly incorporated by reference. In the event that any inconsistency exists between the disclosure of the present application and the disclosure(s) of any document incorporated herein by reference, the disclosure of the present application shall govern. The embodiments described above are illustrative of the present invention and other constructions are also possible. Accordingly, the present invention should not be deemed limited to the embodiments described in detail above and shown in the accompanying drawings, but instead only by a fair scope of the claims that follow along with their equivalents.

The invention claimed is:

1. An article comprising:
   a) a first layer comprising a nanostructured first surface comprising nanofeatures and an opposing second surface, wherein the nanostructured first surface comprises recessed features, or protruding features formed of a single composition, or both recessed and protruding features, and wherein the first layer comprises an organic material; and
   b) a second layer comprising a first major surface and an opposing second major surface, the first major surface bonded to a portion of the nanostructured first surface of the first layer via a bonded coupling agent, wherein the article comprises at least one enclosed void defined in part by the nanostructured first surface of the first layer, wherein the second layer comprises an inorganic material, and wherein the bonded coupling agent comprises at least a first functional group that bonds to the nanostructured first surface of the first layer and at least a second different functional group that bonds to the first major surface of the second layer.

2. The article of claim 1, wherein the bonded coupling agent is present as a portion of a coupling agent layer having a thickness of less than 100 nanometers (nm).

3. The article of claim 1, wherein the bonded coupling agent directly bonds the first major surface of the second layer to the nanostructured first surface of the first layer.

4. The article of claim 1, wherein the inorganic material comprises an oxide, a nitride, a carbide, or a boride of a metal or a nonmetal, or combinations thereof.

5. The article of claim 1, wherein the inorganic material comprises an oxide of titanium, indium, tin, tantalum, zirconium, niobium, aluminum, silicon, or combinations thereof.

6. The article of claim 1, wherein the inorganic material comprises glass.

7. The article of claim 1, wherein the inorganic material is in the form of a self-supporting layer.

8. The article of claim 1, wherein the inorganic material is in the form of a coating or layer that is not self-supporting, and wherein the second layer comprises the inorganic material supported on a polymeric material.

9. The article of claim 1, wherein the at least one enclosed void contains a gas.

10. The article of claim 1, wherein the first layer comprises a crosslinked material or a crosslinkable material.

11. The article of claim 1, wherein the bonded coupling agent comprises at least one functional group selected from an acrylate, a urethane, a urea, an alkylene, a ureido, an isocyanate, an epoxy, an alcohol, an amine, a thiol, a phenol, an amino, an acid, a heteroatom, and at least one of silicon, phosphorous, titanium, or zirconium.

12. The article of claim 1, wherein the second layer is nonporous.

13. An optical element including the article of claim 1.

* * * * *